US011738671B2

(12) United States Patent
Hoshi et al.

(10) Patent No.: US 11,738,671 B2
(45) Date of Patent: Aug. 29, 2023

(54) PADDED AND VENTILATED VEHICLE SEAT

(71) Applicant: TS TECH CO., LTD., Saitama (JP)

(72) Inventors: Yuichiro Hoshi, Tochigi (JP); Kazuki Kobayashi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/750,493

(22) Filed: May 23, 2022

(65) Prior Publication Data

US 2022/0281366 A1 Sep. 8, 2022

Related U.S. Application Data

(63) Continuation of application No. 17/260,588, filed as application No. PCT/JP2019/024010 on Jun. 18, 2019, now Pat. No. 11,338,712.

(30) Foreign Application Priority Data

| Jul. 17, 2018 | (JP) | 2018-133856 |
| Jul. 17, 2018 | (JP) | 2018-133857 |
| Mar. 26, 2019 | (JP) | 2019-057670 |

(51) Int. Cl.
*B60N 2/56* (2006.01)

(52) U.S. Cl.
CPC ......... *B60N 2/5607* (2013.01); *B60N 2/5657* (2013.01)

(58) Field of Classification Search
CPC .. B60N 2/5635; B60N 2/5628; B60N 2/5607; B60N 2/5642; B60N 2/5621; B60N 2/56; A47C 7/74
See application file for complete search history.

(56) References Cited

U.S. PATENT DOCUMENTS

| 6,736,452 B2 | 5/2004 | Aoki |
| 7,261,372 B2 | 8/2007 | Aoki |
| (Continued) | | |

FOREIGN PATENT DOCUMENTS

| FR | 2829728 | 3/2003 |
| JP | S59-182257 | 12/1984 |
| (Continued) | | |

OTHER PUBLICATIONS

PCT International Search Report for corresponding Application No. PCT/JP2019/024010, dated Aug. 26, 2019, 2 pages.

(Continued)

*Primary Examiner* — Milton Nelson, Jr.
(74) *Attorney, Agent, or Firm* — Dority & Manning, P.A.

(57) ABSTRACT

A vehicle seat which can restrain displacement of a duct from a pad is provided. The vehicle seat includes a blower, the pad (P) including an air passage formed therein and a hole (B2) communicating with the air passage, the duct (100) connected to the hole (B2) and configured to connect the blower and the air passage, and a holding member (150) connected to the duct (100). The duct (100) includes a first tubular portion (133) positioned in the hole (B2), and a first flange (134) extending outward from the first tubular portion (133). The holding member (150) includes a second tubular portion (151) connected to the first tubular portion (133), and a second flange (152) extending outward from the second tubular portion (151). The first flange (134) and the second flange (152) hold the pad therebetween.

6 Claims, 29 Drawing Sheets

(56) References Cited

U.S. PATENT DOCUMENTS

| | | |
|---|---|---|
| 7,322,643 B2 | 1/2008 | Ishima et al. |
| 7,478,869 B2 | 1/2009 | Lazanja |
| 7,607,739 B2 | 10/2009 | Browne |
| 7,810,848 B2 | 10/2010 | Yoshino |
| 7,862,113 B2 | 1/2011 | Knoll |
| 10,433,647 B2 | 10/2019 | Jibiki et al. |
| 2008/0048447 A1 | 2/2008 | Yoshino |
| 2015/0291072 A1 | 10/2015 | Ito |
| 2018/0070731 A1 | 3/2018 | Jibiki et al. |
| 2019/0176663 A1 | 6/2019 | Hoshi et al. |
| 2020/0031257 A1 | 1/2020 | Okimura et al. |
| 2020/0361350 A1 | 11/2020 | Hoshi et al. |

FOREIGN PATENT DOCUMENTS

| | | |
|---|---|---|
| JP | H07317982 | 12/1995 |
| JP | 2000-052747 | 2/2000 |
| JP | 2005287536 | 10/2005 |
| JP | 2007333108 | 12/2007 |
| JP | 2009019645 | 1/2009 |
| JP | 2009-023477 | 2/2009 |
| JP | 2014036744 | 2/2014 |
| JP | 2015172415 | 10/2015 |
| JP | 2017210190 A | 11/2017 |
| JP | 2018020714 | 2/2018 |
| JP | 2018043687 A | 3/2018 |
| JP | 2018051152 | 4/2018 |
| JP | 2019-026255 | 2/2019 |
| WO | WO-2016043531 | 3/2016 |

OTHER PUBLICATIONS

PCT International Search Report and Written Opinion Corresponding for corresponding Application No. PCT/JP2019/024010, dated Sep. 3, 2019, 10 pages.

Office Action for Chinese Application No. 201980047779.3, dated Sep. 5, 2022, 7 pages.

Japanese Office Action (w/ English translation) for Corresponding Japanese Application No. 2018-133856, dated Jun. 8, 2022, 4 pages.

Japanese Office Action (w/ English translation) for Corresponding Japanese Application No. 2018-133857, dated Jun. 8, 2022, 7 pages.

U.S. Notice of Allowance for corresponding U.S. Appl. No. 17/260,588, dated Jan. 24, 2022, 5 pages.

U.S. Office Action for corresponding U.S. Appl. No. 17/260,588, dated Aug. 3, 2021, 20 pages.

Japanese Office Action (w/ English translation) for corresponding Japanese Application No. 2019-057670, dated Feb. 28, 2023, 9 pages.

FIG.6
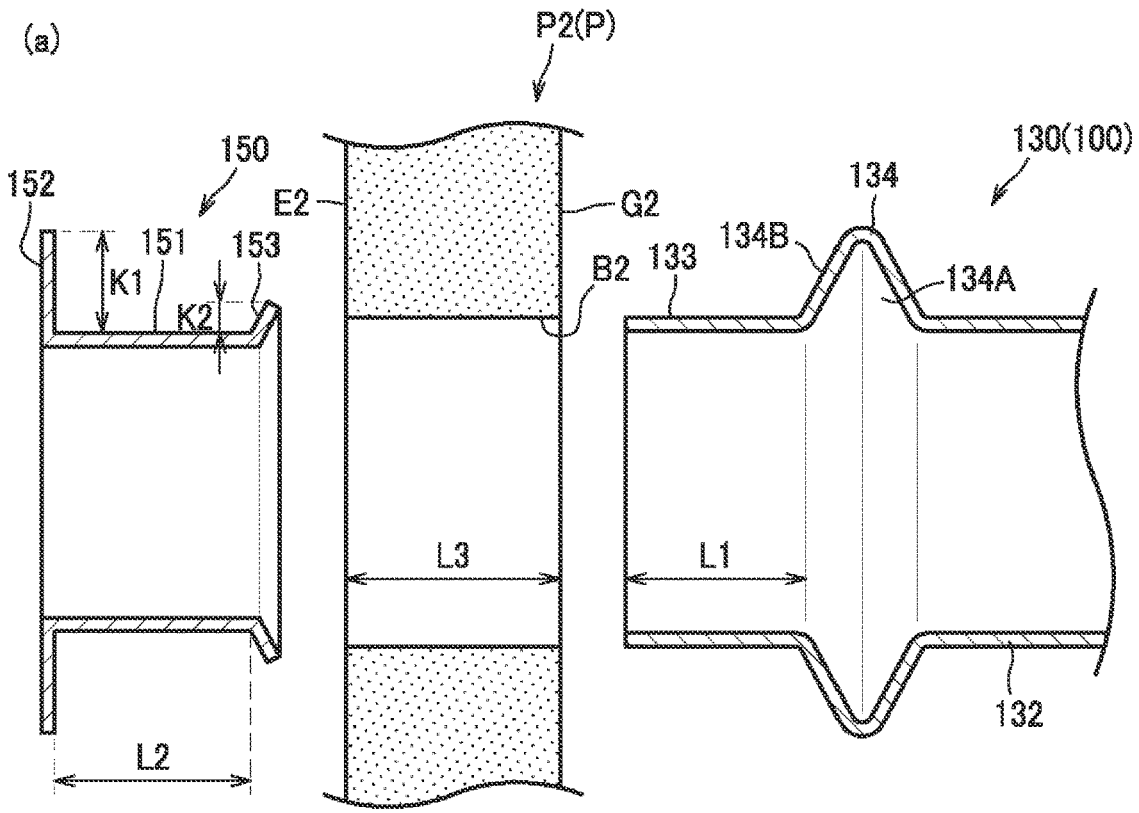
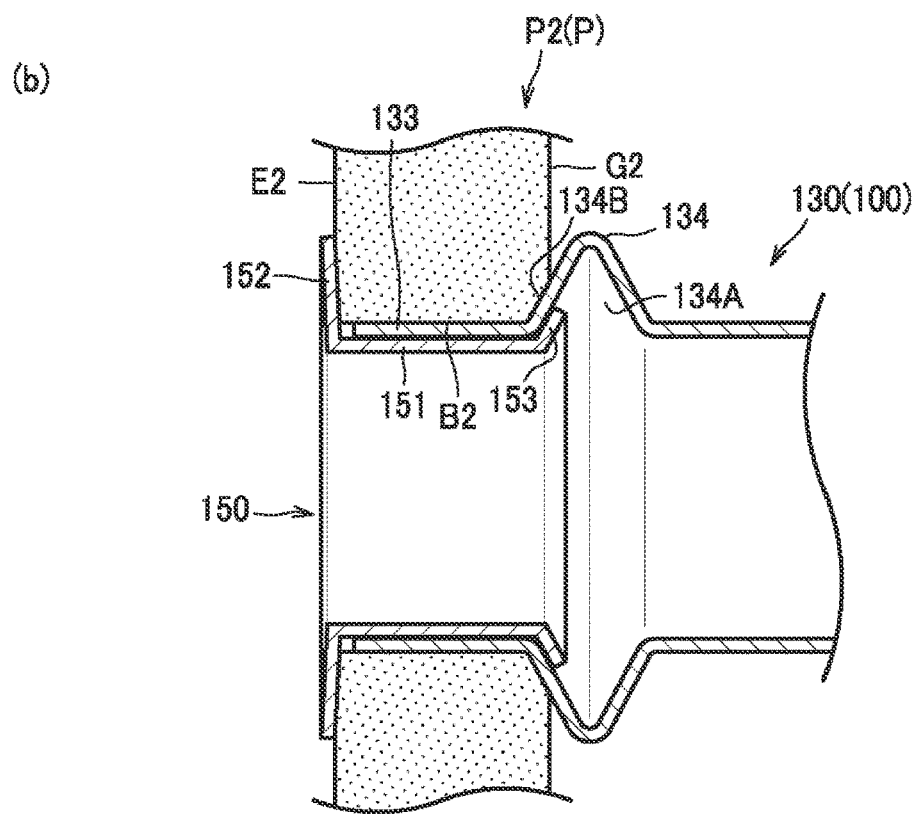

FIG.15
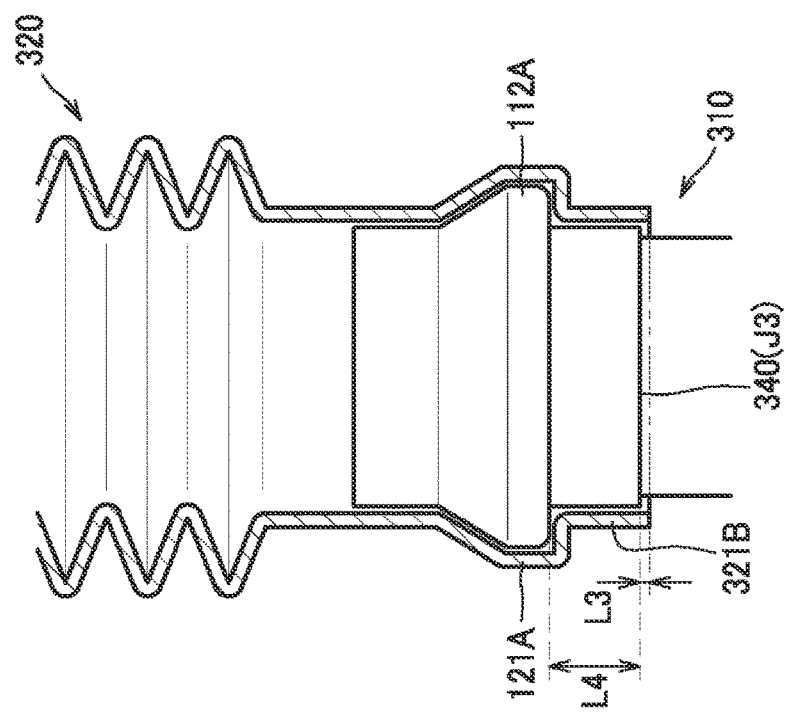
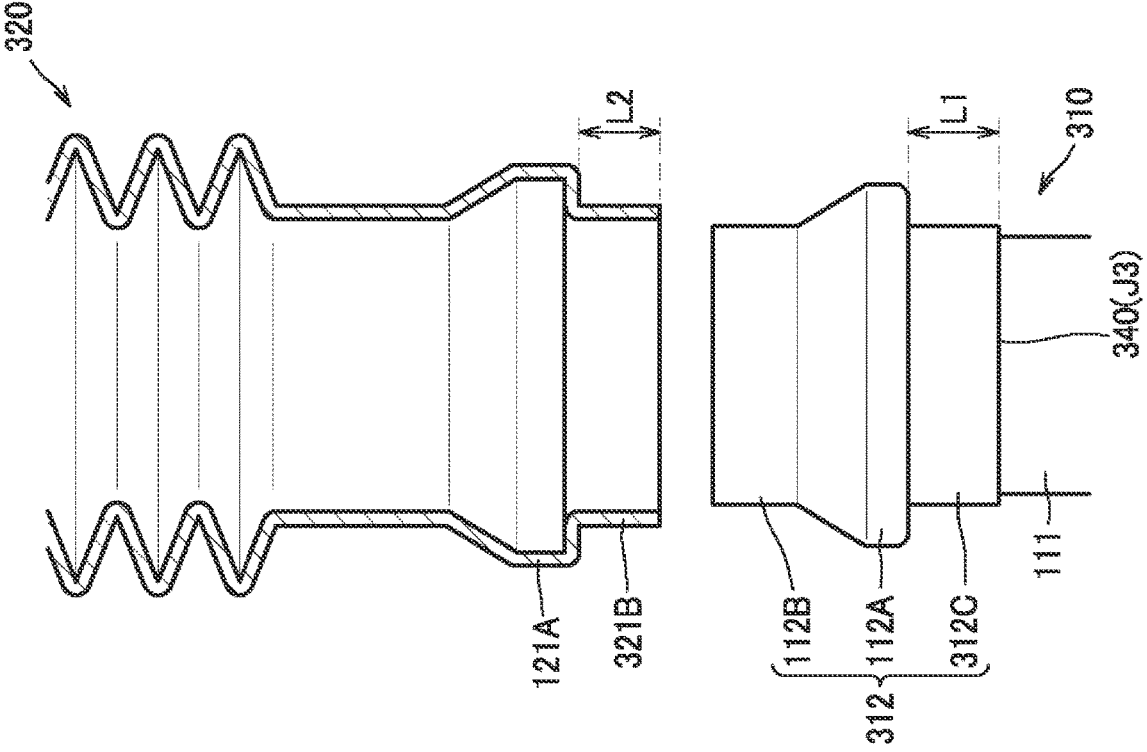

FIG.23
(a)
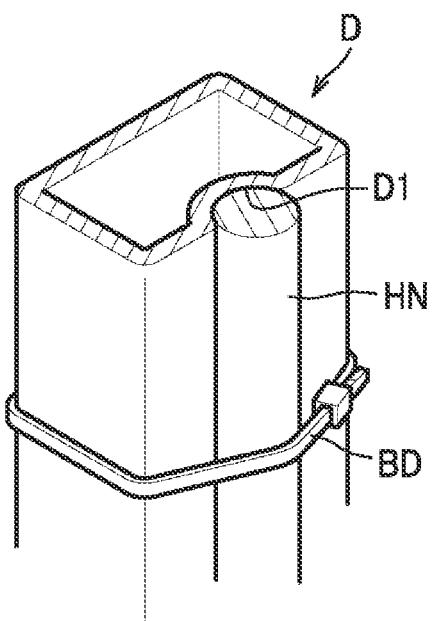
(b)
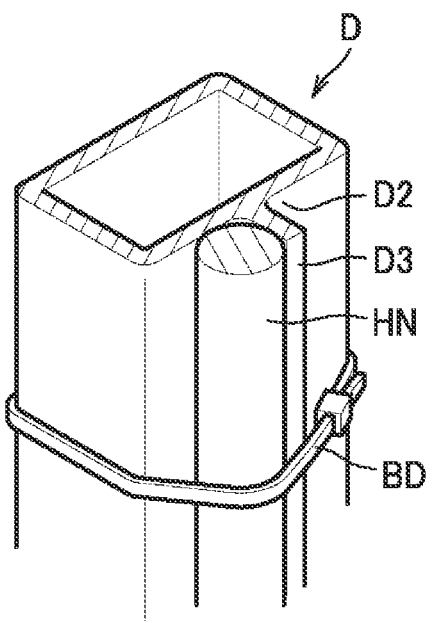

FIG.27
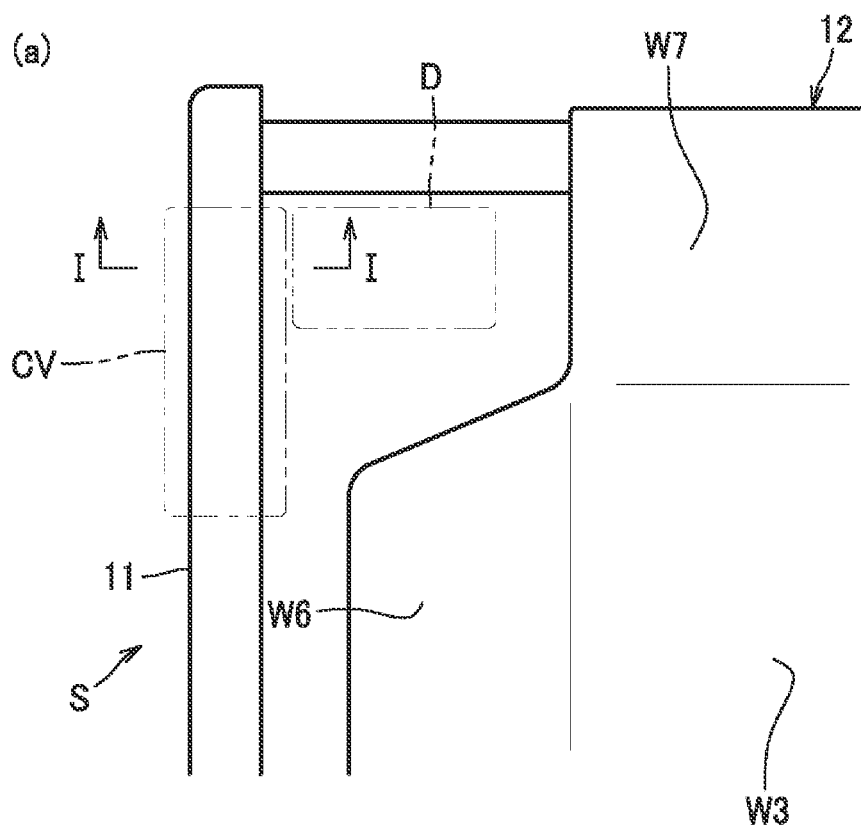
(a)
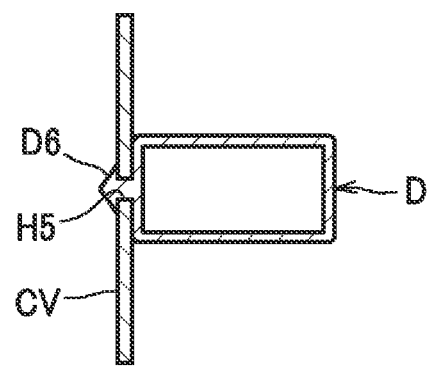
(b)

PADDED AND VENTILATED VEHICLE SEAT

CROSS REFERENCE TO RELATED APPLICATIONS

This application is a continuation of U.S. application Ser. No. 17/260,588, which is the U.S. National Stage entry of International Application Number PCT/JP2019/024010 filed under the Patent Cooperation Treaty having a filing date of Jun. 18, 2019, which claims priority to Japanese Patent Application No. 2018-133856 having a filing date of Jul. 17, 2018, Japanese Patent Application No. 2018-133857 having a filing date of Jul. 17, 2018, and Japanese Patent Application No. 2019-057670 having a filing date of Mar. 26, 2019, all of which are incorporated herein by reference.

TECHNICAL FIELD

The present disclosure relates to a vehicle seat including an air passage, and a duct configured to connect the air passage to a blower.

BACKGROUND ART

A vehicle seat configured to deliver conditioned air to a seat cushion and/or a seat back is known in the art (see Patent Document 1, Patent Document 2, and Patent Document 3). In these vehicle seats, air passages and discharge ports are formed in pads of a seat cushion and/or a seat back, and conditioned air is delivered from a blower arranged under the seat cushion to the air passages in the pads via a duct. The vehicle seat disclosed in Patent Document 1 proposes to use a duct including a bellows of an optimized size and shape so that the duct is not easily disengaged and air leakage is unlikely to occur.

In the vehicle seat disclosed in Patent Document 2, an annular fitting recess is formed on an inner periphery of a first duct, and an annular fitting protrusion is formed on an outer periphery of a first connecting duct. The fitting recess is fitted on the fitting protrusion to hermetically connect the first duct and the first connecting duct.

The vehicle seat disclosed in Patent Document 3 includes a duct that extends from a blower arranged under a seat cushion toward a seat back, and the seat cushion includes a pressure-receiving member that receives a load from an occupant seated on the seat. The pressure-receiving member is engaged with a rear frame that connects left and right side frames of the seat cushion. The pressure-receiving member is mainly comprised of a plurality of wire members.

CITATION LIST

Patent Literatures

Patent Document 1: JP 2009-023477 A
Patent Document 2: JP2000-052747 A
Patent Document 3: JP2018-144517 A

SUMMARY OF INVENTION

In the structure disclosed in Patent Document 1, a connection of the duct may be displaced from the pad when an occupant moves the seat, for example, to recline the seat.

Therefore, it is desirable to provide a vehicle seat that restrains displacement of a duct from a pad.

Further, it is desirable to make the duct easily attachable to the pad, to reduce air leakage from the pad, to stabilize airflow inside the duct, and to lessen adverse effects on the flexibility of the pad.

When a duct is connected by fitting an annular recess and an annular protrusion (hereafter referred to as "whole perimeter fit") as described in Patent Document 2, there would arise a problem that if the recess and the protrusion are not properly fitted together, a gap is likely formed between the ducts, and thus hermeticity cannot be ensured.

Therefore, it is desirable to provide a vehicle seat in which hermeticity of a duct is ensured.

Further, it is desirable to reduce blockage of airflow inside the duct, to restrain reduction of strength of the duct, and to make it easy to check the connection of the duct.

In Patent Document 3 the pressure-receiving member is comprised of a plurality of wire members and there is no intention to configure the pressure-receiving member as a plate-like member. When the pressure-receiving member is configured as a plate-like member, the pressure-receiving member and the duct are likely to interfere with each other which may cause wear of the pressure-receiving member or the duct.

Therefore, it is desirable that when the pressure-receiving member is configured as a plate-like member, wear of the pressure-receiving member or the duct caused by interference of the pressure-receiving member and the duct be reduced.

Against the backdrop mentioned above, in one aspect, a vehicle seat is disclosed which comprises a pad including an air passage formed therein, and a hole communicating with the air passage; a duct connected to the hole and configured to connect a blower and the air passage; and a holding member connected to the duct.

The duct comprises a first tubular portion positioned in the hole, and a first flange extending outward from the first tubular portion. The holding member comprises a second tubular portion connected to the first tubular portion, and a second flange extending outward from the second tubular portion. The first flange and the second flange hold the pad therebetween.

According to this configuration, since the first flange and the second flange hold the pad therebetween, the duct is stably connected to the pad. As a result, displacement of the connecting portion of the duct with respect to the pad can be restrained. Further, since the duct and the holding member are separate members, it is easy to attach the duct to the pad.

The vehicle seat described above may be configured such that the first flange comprises an inclined surface that is inclined with respect to the first tubular portion.

According to this configuration, the inclined surface is pressed against the pad when the duct is attached to the pad. This causes a portion of the pad to be locally squeezed in such a manner that a gap between the pad and the duct is eliminated, and thus can serve to reduce leakage.

The vehicle seat described above may be configured such that the first tubular portion and the second tubular portion overlap one another between the first flange and the second flange.

According to this configuration, the strength of the overlapped portions increases, and thus the airflow is stabilized.

The vehicle seat described above may be configured such that the first tubular portion has a constant cross-sectional shape.

According to this configuration, the airflow inside the first tubular portion is stabilized.

The vehicle seat described above may be configured such that the first tubular portion is in contact with an inner surface of the hole of the pad.

According to this configuration, air leakage from the connection between the pad and the duct can be reduced.

The vehicle seat described above may be configured such that the first flange includes a hollow space that communicates with the duct.

According to this configuration, the duct becomes more flexible in the periphery of the hollow space. As a result, adverse effects on the flexibility of the pad P can be restrained.

The vehicle seat described above may be configured such that the holding member further comprises a third flange extending outward from the second tubular portion, the third flange being located at a position different from a position of the second flange, and the third flange being positioned in the hollow space.

According to this configuration, disengagement of the holding member from the duct can be restrained.

The vehicle seat described above may be configured such that the duct comprises a bellows which is extendable and contractable, and the bellows includes the first flange.

According to this configuration, the duct is extendable and contractable, and thus adverse effects on the flexibility of the pad P can be restrained.

In a second aspect, a vehicle seat is suggested which comprises a pad including an air passage formed therein, and a duct configured to connect a blower and the air passage. The duct comprises a first duct, and a second duct fitted to the first duct. The first duct comprises a first annular engagement portion having a shape of a ridge or a groove which extends around a whole perimeter of an outer peripheral surface of the first duct. The second duct comprises a second annular engagement portion having a shape of a groove or a ridge extending around a whole perimeter of an inner peripheral surface of the second duct and configured to engage with the first annular engagement portion, and an engagement confirmation portion that is visually checkable to confirm engagement of the first annular engagement portion and the second annular engagement portion.

According to this configuration, engagement of the first annular engagement portion and the second annular engagement portion can be visually checked when the first duct and the second duct are fitted by a whole perimeter fit, and thus it is easy to properly connect the first duct and the second duct whereby hermeticity of the duct can be insured.

The vehicle seat described above may be configured such that the first annular engagement portion has a shape of a ridge formed by the outer peripheral surface protruding outward, and the second annular engagement portion has a shape of a groove formed by the inner peripheral surface depressed inward.

According to this configuration, obstruction of airflow inside the duct by the first annular engagement portion and the second annular engagement portion can be reduced.

The vehicle seat described above may be configured such that the engagement confirmation portion comprises an opening formed in the second duct.

According to this configuration, engagement of the first annular engagement portion and the second annular engagement portion can be checked through the opening.

The vehicle seat described above may be configured such that the first duct comprises a protrusion that is positioned in the opening when the first annular engagement portion and the second annular engagement portion are engaged with each other, and the engagement confirmation portion includes the protrusion.

According to this configuration, the proper engagement of the first annular engagement portion and the second annular engagement portion can be checked by visually observing that the protrusion is positioned in the opening.

The vehicle seat described above may be configured such that the second duct has a cross-sectional shape larger in a second direction than in a first direction, the second direction orthogonal to the first direction, and the opening is formed in a side surface of the second duct extending along the second direction.

According to this configuration, the opening is formed in the broader side of the second duct, and thus reduction of strength of the duct can be restrained compared to the case where the opening is formed in the narrower side The vehicle seat described above may be configured such that the opening is located closer, than the second annular engagement portion, to an extreme end of the second duct.

According to this configuration, air leakage from the connection of the duct can be reduced.

The vehicle seat described above may be configured such that the opening is formed in a part of the second annular engagement portion.

According to this configuration, the first annular engagement portion can be visually observed from the opening to check engagement of the first annular engagement portion and the second annular engagement portion.

The vehicle seat described above may be configured such that the second duct comprises a bellows that is extendable and contractable.

According to this configuration, the second duct becomes more bendable and flexible, and adverse effects on the flexibility of the pad can be restrained.

The vehicle seat described above may be configured such that the engagement confirmation portion is a marker formed on the first duct, wherein the marker is located farther, than the first annular engagement portion, from an extreme end of the first duct, and covered by the second duct when the first duct is fitted to the second duct.

According to this configuration, engagement of the first annular engagement portion and the second annular engagement portion can be checked by visually observing that the marker formed on the first duct is covered with the first duct.

In the vehicle seat described, it is preferable that when the first annular engagement portion and the second annular engagement portion are engaged with each other, a distance from the marker to an extreme end of the second duct is shorter than a distance from the marker to the first annular engagement portion.

According to this configuration, if the marker is covered with the second duct, it is likely that the first annular engagement portion and the second annular engagement portion are properly engaged with each other, and hermeticity of the duct can be more reliably ensured.

The vehicle seat described above may be configured such that the engagement confirmation portion comprises a window formed in the second duct, and a marker formed on the first duct, and when the first annular engagement portion and the second annular engagement portion are engaged with each other, the marker is located visually observable through the window.

According to this configuration, by visually observing the marker formed on the first duct through the window formed in the second duct, engagement of the first annular engagement portion and the second annular engagement portion can be checked.

The vehicle seat described above may further comprise a seat frame including a pair of side frames, and a connecting member connecting the pair of side frames, wherein a fitted portion of the first duct and the second duct faces the connecting member, and the engagement confirmation portion is formed on a surface that does not face the connecting member.

According to this configuration, the engagement confirmation portion is not hidden by the connecting member; therefore, it is easy to visually observe the engagement confirmation portion during assembly or other operations, and hermeticity of the duct can thereby be ensured.

In a third aspect, a vehicle seat is suggested which comprises a seat cushion, a seat back, and a duct arranged to extend across the seat cushion and the seat back and configured to connect a blower and an air passage formed in at least one of the seat cushion and the seat back.

The seat cushion comprises left and right cushion side frames that constitute left and right frames of the seat cushion; a rear frame that connects rear portions of the left and right cushion side frames; and a plate-shaped pressure-receiving member engaged with the rear frame.

The duct is arranged around the pressure-receiving member.

According to this configuration, the duct is arranged around the pan frame, and thus wear of the pressure-receiving member or the duct that may be caused by interference of the pressure-receiving member and the duct can be reduced.

The duct may be arranged between the rear frame and the pressure-receiving member.

According to this configuration, the duct can be arranged in a compact manner by making use of the space between the rear frame and the pressure-receiving member.

The duct may be arranged between the pressure-receiving member and the cushion side frames.

According to this configuration, even if a foot of an occupant seated on a seat behind the vehicle seat hits the pressure-receiving member, there will be no impact on the duct; therefore, damage of the duct caused by the occupant kicking the duct by his/her foot can be restrained.

The duct may be in contact with the pressure-receiving member.

According to this configuration, the duct can be located in place relative to the pressure-receiving member by contact therewith.

The duct may be fixed to the pressure-receiving member.

According to this configuration, the duct can be supported by the pressure-receiving member.

The duct may be in contact with the rear frame.

According to this configuration, the duct can be located in place relative to the rear frame by contact therewith.

The vehicle seat described above may further comprise a harness attached to the seat back, wherein the harness extends through between one of the cushion side frames and the pressure-receiving member, and the duct extends through between another of the cushion side frames and the pressure-receiving member.

According to this configuration, the duct can be kept from getting in the way when the harness is arranged.

The vehicle seat described above may further comprise a harness attached to the seat back, which harness is in contact with the duct.

According to this configuration, the harness can be supported by the duct.

The harness may be fixed to the duct.

According to this configuration, the harness can be more securely supported by the duct.

The vehicle seat described above may further comprise a frame member that constitutes a frame of the seat cushion or the seat back, the frame member being covered with the pad; and an outer covering that covers the pad.

BRIEF DESCRIPTION OF DRAWINGS

FIG. 6 includes a sectional view (a) of the third duct before connection to a pad, and a sectional view (b) of the third duct after connection to the pad.

FIG. 15 includes sectional views of a fitted portion and its vicinity of a duct of a fifth modified example before it is fitted (a) and after it is fitted (b).

FIG. 23 includes perspective views (a), (b) showing configurations for fixing the harness on the duct.

FIG. 27 includes a plan view (a) showing a configuration provided with an inner cover, and a sectional view (b) taken along line I-I of FIG. 27(a).

DESCRIPTION OF EMBODIMENTS

Hereinafter, a description will be given of a first embodiment of a vehicle seat with reference made to the accompanying drawings. In this description, the front/rear (frontward/rearward), left/right (leftward/rightward; lateral), and up/down (upper/lower; upward/downward; vertical) are represented with reference to the front-rear, left/right, and up-down directions as viewed from a person seated on the seat.

Figure 1:
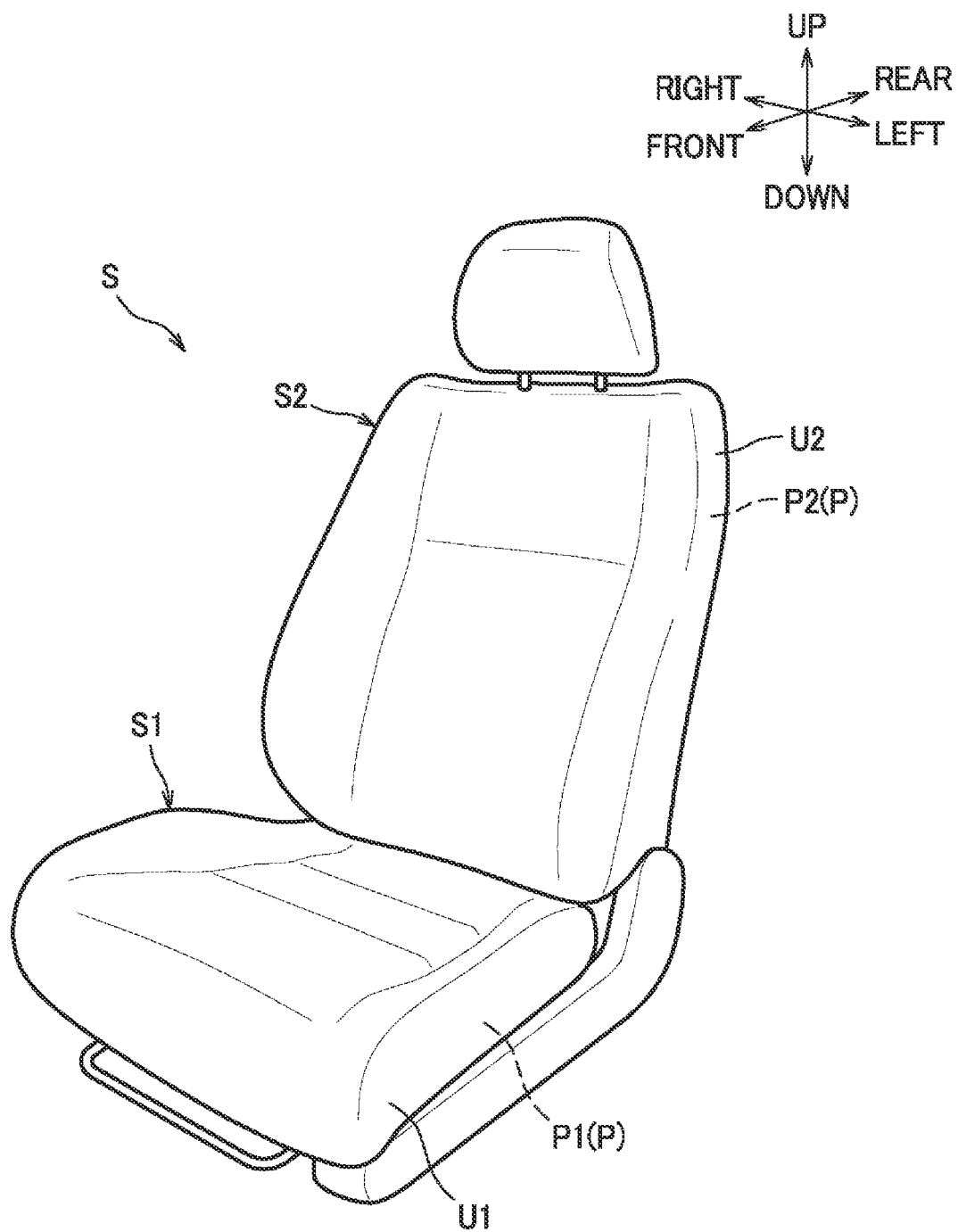
FIG. 1 is a view of a car seat according to a first embodiment.

As shown in FIG. 1, the vehicle seat of the present embodiment is configured as a car seat S to be installed in an automobile, and includes a seat cushion S1 and a seat back S2.

Figure 2:
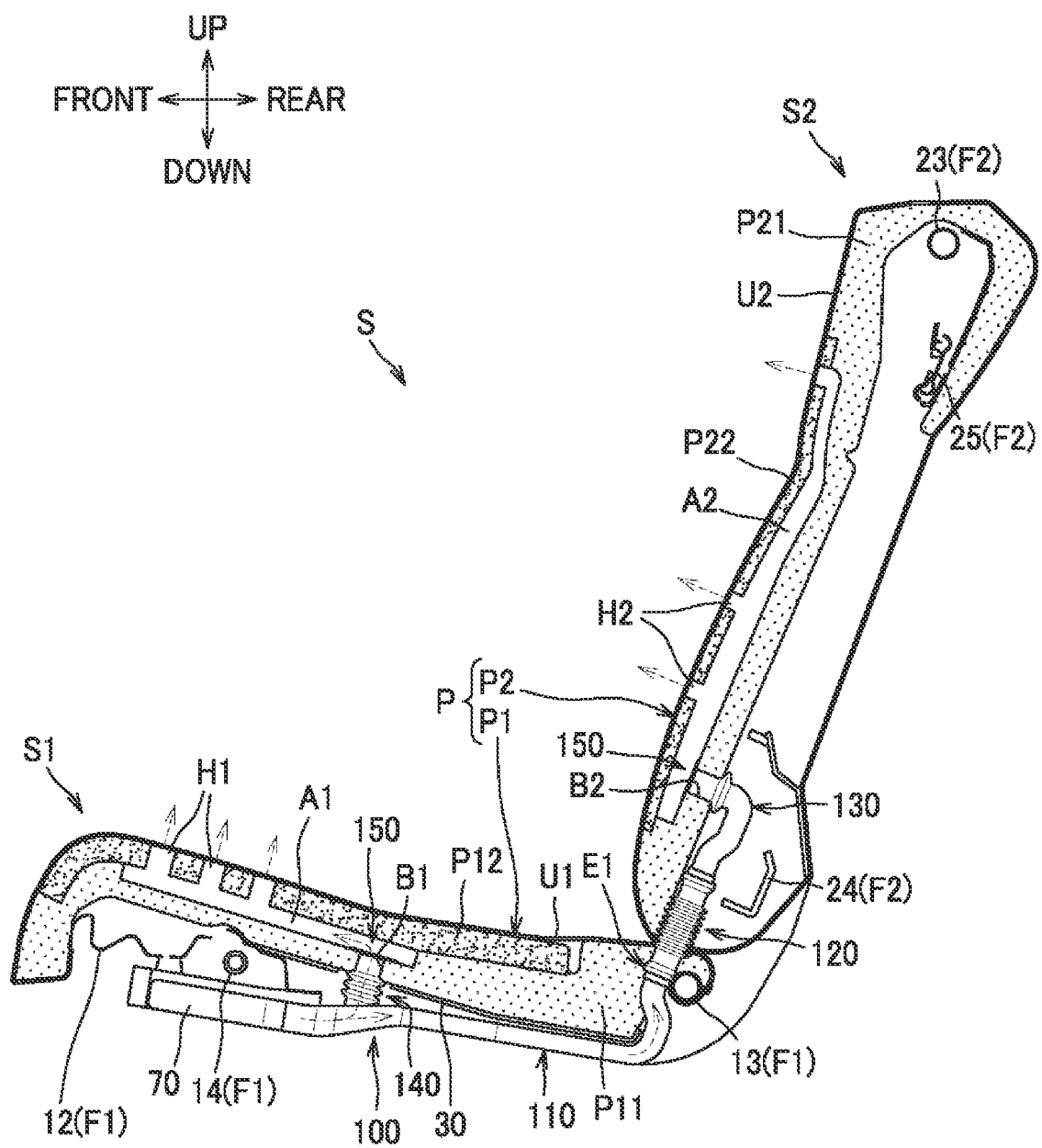
FIG. 2 is a sectional view of the car seat.

As shown in FIG. 2, the car seat S is formed by covering a seat frame F (see FIG. 3) as a frame member with a pad P made of urethane foam or the like and outer coverings U1, U2 made of fabrics, leather or the like. The pad P covers the seat frame F, and the outer coverings U1, US cover the pad P.

The pad P includes a seat cushion pad P1 which constitutes a pad of the seat cushion S1, and a seat back pad P2 which constitutes a pad of the seat back S2.

The seat cushion pad P1 includes an air passage A1, a plurality of ventilation holes H1, and a hole B1. The air passage A1 is formed inside the seat cushion pad P1. The plurality of ventilation holes H1 open on an upper surface of the seat cushion pad P1 and communicate with the air passage A1. The hole B1 opens on a lower surface of the seat cushion pad P1 and communicates with the air passage A1. The seat cushion pad P1 is a combination of a pad body P11 that forms a surface of a part of the air passage A1, and a cover pad P12 attached to the pad body P11. The pad body P11 is configured such that a part of the air passage A1 to which the hole B1 is connected is exposed before the cover pad P12 is attached to the pad body P11. In this embodiment, the ventilation holes H1 are formed in the cover pad P12. The cover pad P12 may be attachable to and removable from the pad body P11.

The seat back pad P2 includes an air passage A2, a plurality of ventilation holes H2, and hole B2. The air passage A2 is formed inside the seat back pad P2. The plurality of ventilation holes H2 open on a front surface of the seat back pad P2 and communicate with the air passage A2. The hole B2 opens on a rear surface of the seat back pad P2 and communicates with the air passage A2. The seat back pad P2 is a combination of a pad body P21 that forms a surface of a part of the air passage A2, and a cover pad P22 attached to the pad body P21. The pad body P21 is configured such that a part of the air passage A2 to which the hole B2 is connected is exposed before the cover pad P22 is attached to the pad body P21. In this embodiment, the ventilation holes H2 are formed in the cover pad P22. The cover pad P22 may be attachable to and removable from the pad body 21.

The air passages A1, A2 are connected to a blower 70 via a duct 100. To be more specific, the duct 100 has one end connected to the blower 70 and the other end connected to the holes B1, B2 of the pad P. and thereby connects the blower 70 and the air passages A1, A2 of the pad P. The blower 70 is a sirocco fan, and is disposed under the seat cushion S1. The car seat S is configured to deliver air from the blower 70 through the duct 100, the holes B1, B2, and the air passages A1, A2, and to blow out the air toward an occupant seated on the seat.

Figure 3:
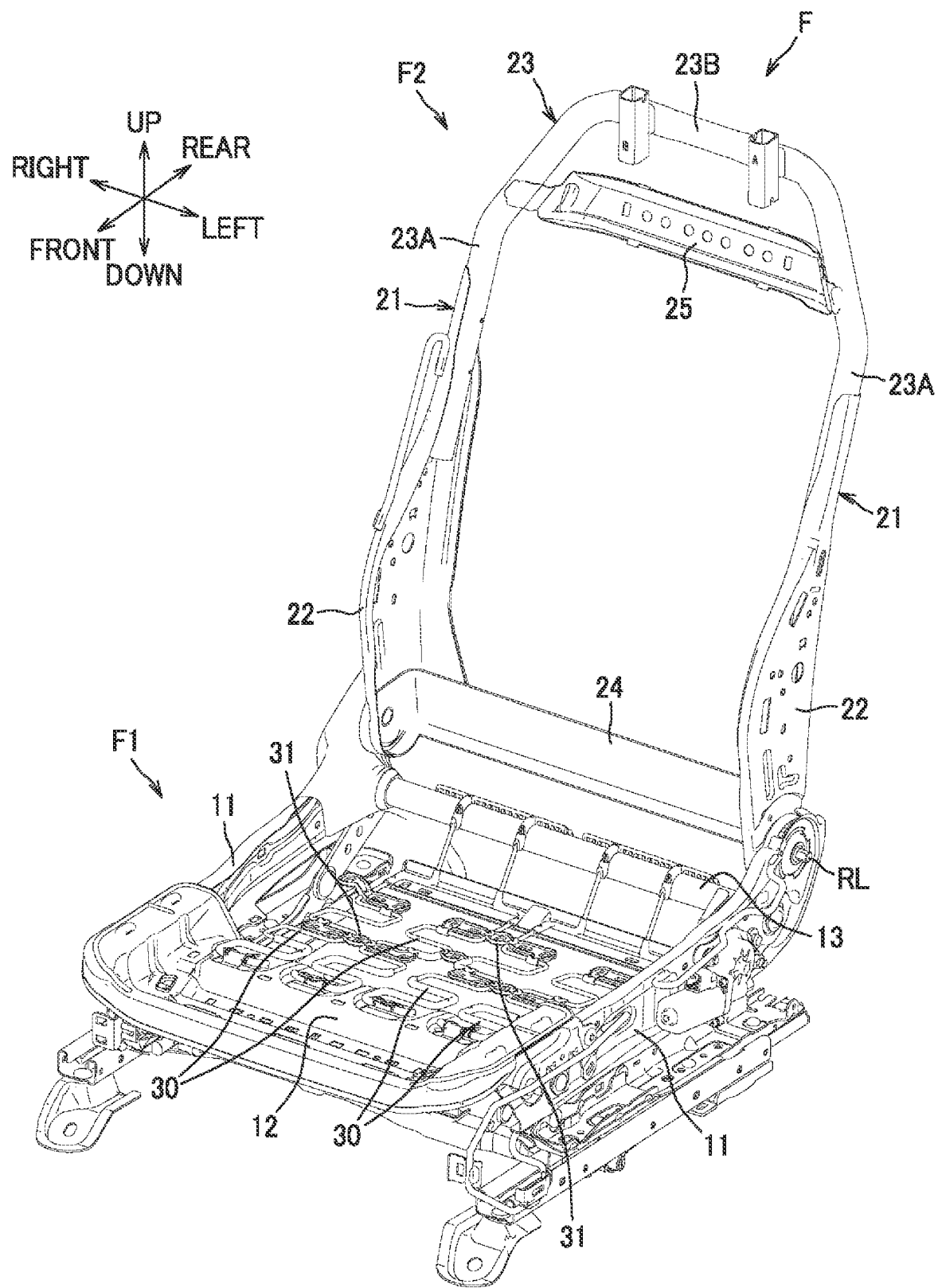
FIG. 3 is a perspective view of a seat frame.

As shown in FIG. 3, the seat frame F includes a seat cushion frame F1 which constitutes a frame of the seat cushion S1, and a seat back frame F2 which constitutes a frame of the seat back S2.

The seat cushion frame includes a pair of cushion side frames 11, a pan frame 12, a rear pipe 13, and a front pipe 14 (see FIG. 2). The pair of cushion side frames 11 are members constituting left and right frames of the seat cushion S1, and are located apart from and face each other in a lateral direction. The cushion side frames 11 are made of sheet metal, and are each formed in a shape elongated in the front-rear direction.

Arranged between the pair of cushion side frames 11 of the seat cushion frame F1 are a plurality of wire members 30. The wire members 30 are an example of a pressure-receiving member which receives a load from the occupant seated on the seat. The wire members 30 are metal wires that bridge the pan frame 12 and the rear pipe 13, and adjacent wire members 30 are connected to each other by a plurality of plastic members 31.

The rear pipe 13 and the front pipe 14 connect the pair of cushion side frames 11. To be more specific, the rear pipe 13 connects rear portions of the pair of cushion side frames 11, and the front pipe 14 connects front portions of the pair of cushion side frames 11. The rear pipe 13 and the front pipe 14 are examples of a connecting member that connects the pair of side frames.

The seat back frame F2 includes left and right sheet-metal frames 22, a pipe frame 23, a lower frame 24, and a bridging frame 25. The left and right sheet-metal frames 22 are located apart from and face each other in the lateral direction. The sheet-metal frames 22 are made of sheet metal, and are each formed in a shape elongated in the up-down direction.

The pipe frame 23 is made of metal piping material, and includes left and right upper side frames 23A extending substantially in the up-down direction, and an upper frame 23B that connects upper ends of the upper side frames 23A. The left and right upper side frames 23A of which lower portions are connected to upper portions of the sheet-metal frames 22 form, together with the left and right sheet-metal frames 22, a pair of back side frames 21 constituting left and right frames of the seat back S2. The lower frame 24 is made of sheet metal, and connects lower portions of the pair of back side frames 21. The bridging frame 25 is made of sheet metal, and connects upper portions of the pair of back side frames 21. The lower frame 24, the bridging frame 25, and the upper frame 23B are examples of a connecting member that connects the pair of side frames.

Rear portions of the cushion side frames 11 and lower portions of the back side frames 21 are rotatably linked via a reclining mechanism RL. The car seat S is thereby configured such that the seat back S2 is tiltable relative to the seat cushion S1 frontward and rearward.

Figure 4:
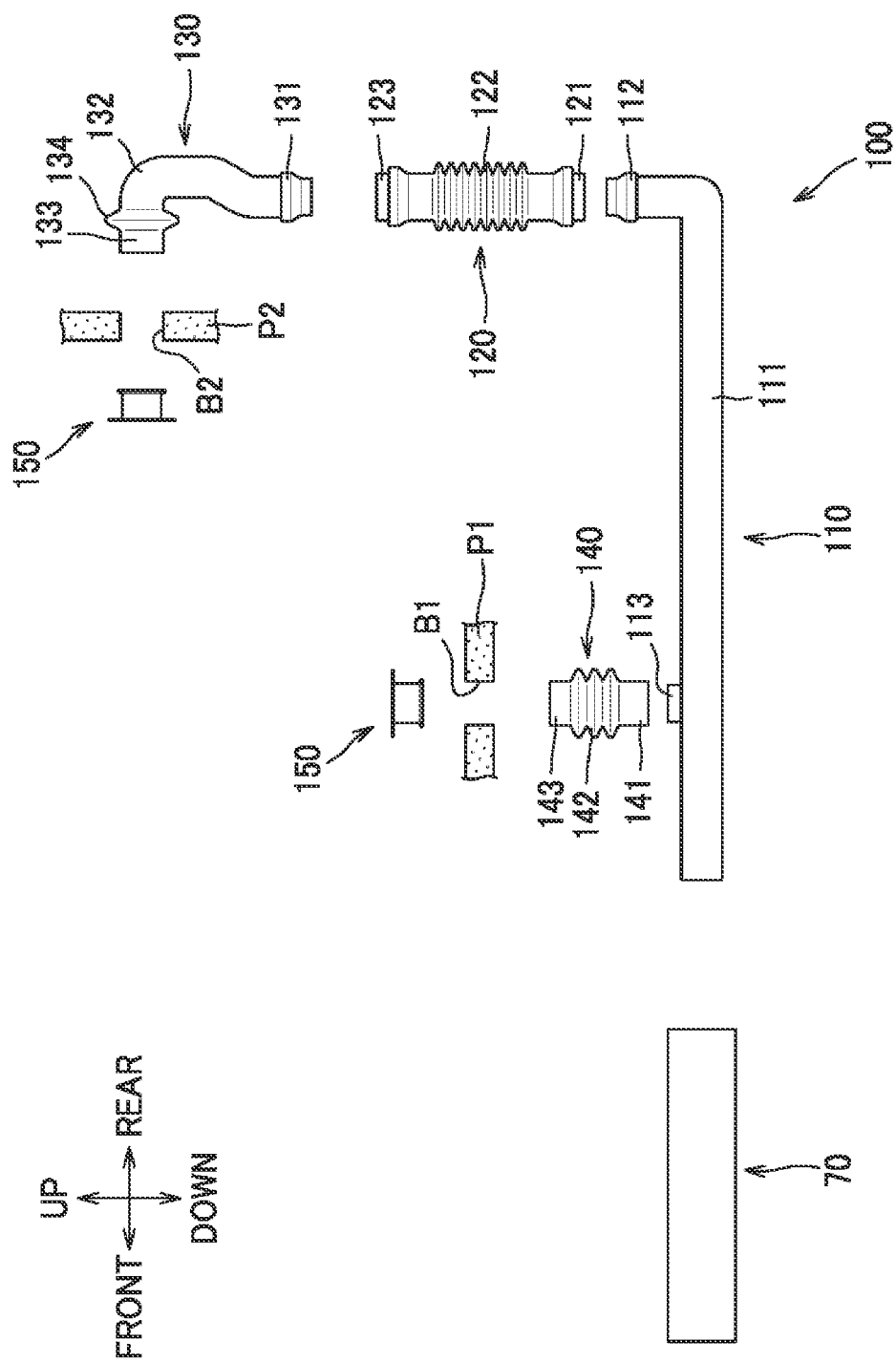
FIG. 4 is a view showing connections of first to fourth ducts.

As shown in FIG. 4, the duct 100 is comprised of a plurality of parts. Specifically, the duct 100 includes a first duct 110, a second duct 120, a third duct 130, and a fourth duct 140.

The first duct 110 includes a body portion 111 extending generally in the front-rear direction, a first connecting portion 112 provided on a rear end of the body portion 111, and a fifth connecting portion 113 provided on a front portion of the body portion 111. The front end of the body portion 111 is connected to the blower 70.

The second duct 120 includes a bellows 122 extending in the up-down direction, a second connecting portion 121 provided below the bellows 122, and a third connecting portion 123 provided above the bellows 122. The bellows 122 has flexibility and is extendable and contractable. The second connecting portion 121 is sized to be fitted on the outside of the first connecting portion 112 of the first duct 110. The second connecting portion 121 of the second duct 120 is connected to the first connecting portion 112 of the first duct 110. The connecting structure of the first duct 110 and the second duct 120 will be described later.

As shown in FIG. 2, the second duct 120 is arranged on the front side of the rear pipe 13 and the lower frame 24 and extends from the seat cushion S1 toward the seat back S2.

As shown in FIG. 4, the third duct 130 includes a body portion 132 extending in the up-down direction, a fourth connecting portion 131 provided below the body portion 132, and a first tubular portion 133 provided above the body portion 132.

An upper portion of the body portion 132 is bent toward the front. A first flange 134 is provided between the body portion 132 and the first tubular portion 133.

As shown in FIG. 6(a), the first flange 134 extends outward from the first tubular portion 133 and the body portion 132. Specifically, the first flange 134 is configured to extend radially outward from the rear end of the first tubular portion 133 and then to gradually taper off to join the body portion 132. Accordingly, the first flange 134 includes a hollow space 134A on the inside which communicates with the duct 100. The hollow space 134A extends around the whole perimeter of the third duct 130. The first flange 134 has an inclined surface 134B that is inclined with respect to the first tubular portion 133.

As shown in FIG. 4, the fourth connecting portion 131 is sized to be fitted inside the third connecting portion 123 of the second duct 120. The fourth connecting portion 131 is connected to the third connecting portion 123 of the second duct 120.

Figure 5:
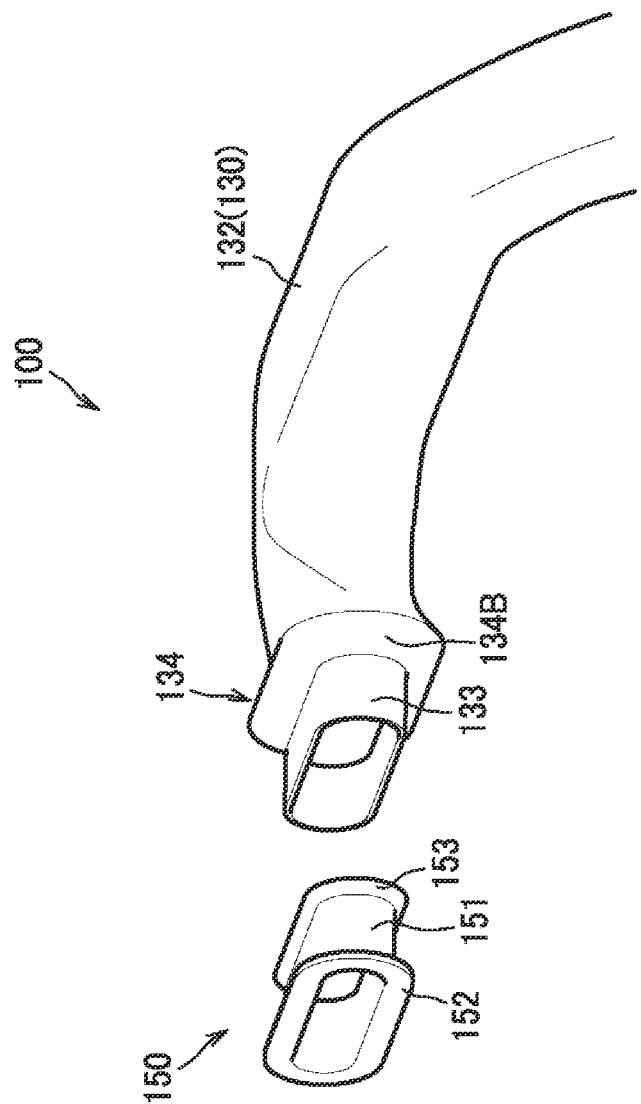
FIG. 5 is an exploded perspective view of a third duct and a holding member.

As shown in FIG. 5, the first tubular portion 133 has a constant cross-sectional shape. The first tubular portion 133 is connected to the hole B2 formed in the seat back pad P2, and a holding member 150 is connected to an end thereof to hold the first tubular portion 133 on the seat back pad P2 so that it will not be accidentally disengaged therefrom, as will be described later.

As shown in FIG. 4, the fourth duct 140 includes a bellows 142 extending in the up-down direction, a sixth connecting portion 141 provided below the bellows 142, and a first tubular portion 143 provided above the bellows 142. The bellows 142 has flexibility and is extendable and contractable. The sixth connecting portion 141 is sized to be fitted on the outside of the fifth connecting portion 113 of the first duct 110. The sixth connecting portion 141 is connected to the fifth connecting portion 113 of the first duct 110.

The first tubular portion 143 has a constant cross-sectional shape. The first tubular portion 143 is connected to the hole B1 formed in the seat cushion pad P1. Similar to the first tubular portion 133 of the third duct 130, a holding member 150 is connected to an end of the first tubular portion 143 to hold the first tubular portion 143 on the seat cushion pad P1 so that it will not be accidentally disengaged therefrom.

Figure 7:
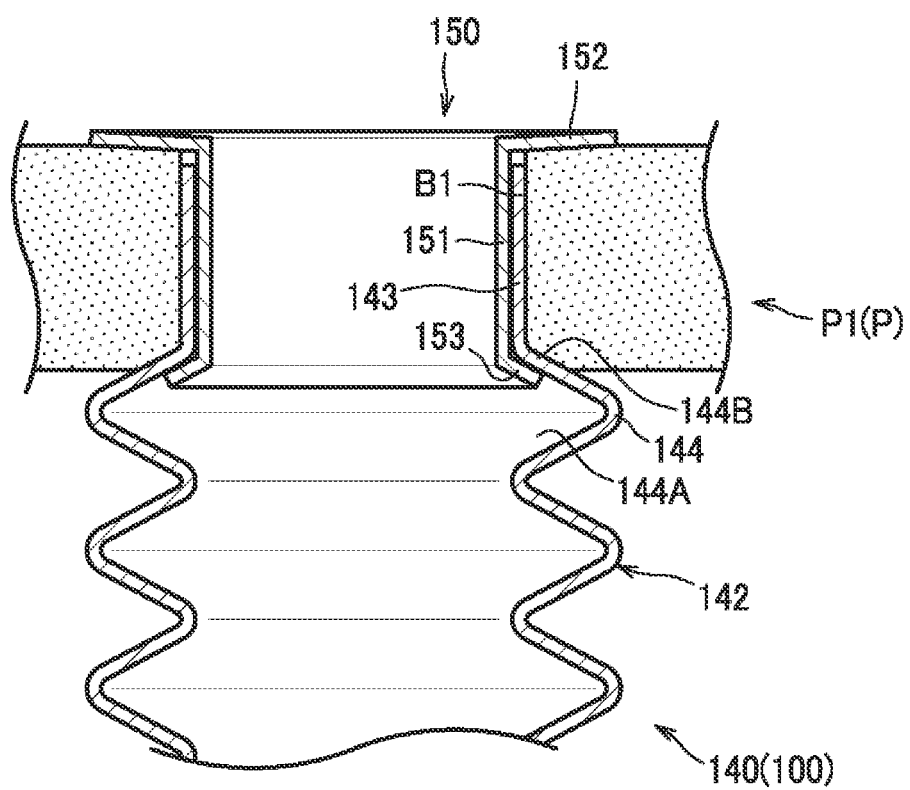
FIG. 7 is a sectional view of the fourth duct after connection to the pad.

As shown in FIG. 7, the uppermost fold of the bellows 142 extends outward from the first tubular portion 143. That is, the uppermost fold of the bellows 142 constitutes a first flange 144 similar to the first flange 134 of the third duct 130. In other words, the bellows 142 includes the first flange 144. The first flange 144 includes a hollow space 144A which communicates with the duct 100, and an inclined surface 144B that is inclined with respect to the first tubular portion 143.

As shown in FIG. 6(a), the holding member 150 includes a second tubular portion 151, a second flange 152, and a third flange 153.

The second flange 152 extends outward from one end of the second tubular portion 151. The second flange 152 has a shape of a plate.

The third flange 153 extends outward from the other end of the second tubular portion 151, i.e., from a position different from that of the second flange 152. The third flange 153 extends obliquely outward from the second tubular portion 151 in such a manner as to gradually extend radially outward as the distance from the second flange 142 increases. The amount of extension K2 of the third flange 153 (the extent of the third flange 153 from the second tubular portion 151 in the radial direction) is smaller than the amount of extension K1 of the second flange 152.

The second tubular portion 151 is connected to the first tubular portion 133. The second tubular portion 151 is sized slightly smaller than the first tubular portion 133 as to enter the inside of the first tubular portion 151, and has a constant cross-sectional shape (see FIG. 5). A length L2 of the second tubular portion 151 is longer than a length L1 of the first tubular portion 133. The length L2 of the second tubular portion 151 (the distance between the second flange 152 and the third flange 153) is shorter than a length L3 of the hole B2 (the thickness of the seat back pad P2).

When the third duct 130 is attached to the seat back pad P2, the cover pad P22 is removed from the pad body P21 to expose the part of air passage A2 connected to the hole B2 (see FIG. 2). After the first tubular portion 133 of the third duct 130 is inserted into the hole B2, the second tubular portion 151 of the holding member 150 is inserted in the inside of the first tubular portion 133. At this time, the third flange 153 of the holding member 150 is flexed in such a manner that the third flange 153 and the second tubular portion 151 enter the inside of the first tubular portion 133 and then the third flange 153 enters the hollow space 134A. The holding member 150 is thereby fixed to the third duct 130. Lastly, the cover pad P22 is attached to the pad body P21.

As shown in FIG. 6(b), when the third duct 130 is attached to the seat back pad P2, the first tubular portion 133 enters the hole B2 and contacts the inner surface of the hole B2. The first tubular portion 133 and the second tubular portion 151 overlap one another between the first flange 134 and the second flange 152. The third flange 153 enters the hollow space 134A and is engaged with the inner surface of the first flange 134. Since an extreme end of the third flange 153 is located radially outside the hole B2 and the first tubular portion 133, even when a force is applied to the holding member 150 or the third duct 130 in a direction that may pull the holding member 150 out of engagement with the third duct 130, the holding member 150 is not easily pulled out of engagement with the third duct 130 by the third flange 153 hooked on the first flange 134.

In such a condition where the third duct 130 is held in the seat back pad P2 by the holding member 150, the first flange 134 and the second flange 152 are located outside the hole B2 of the seat back pad P2 and hold the seat back pad P2 therebetween. At this time, the inclined surface 134B presses a rear-facing face G2 of the seat back pad P2, and the second flange 152 presses a front-facing face E2 (an inner surface of the air passage A2) of the seat back pad P2.

The structure and method for attaching the fourth duct 140 to the seat cushion pad P1 and the effects after attachment are similar to the case where the third duct 130 is attached to the seat back pad P2, and therefore the description thereof will be omitted.

Next, a connecting-by-fitting structure of the first duct 110 and the second duct 120 will be described.

Figure 8:
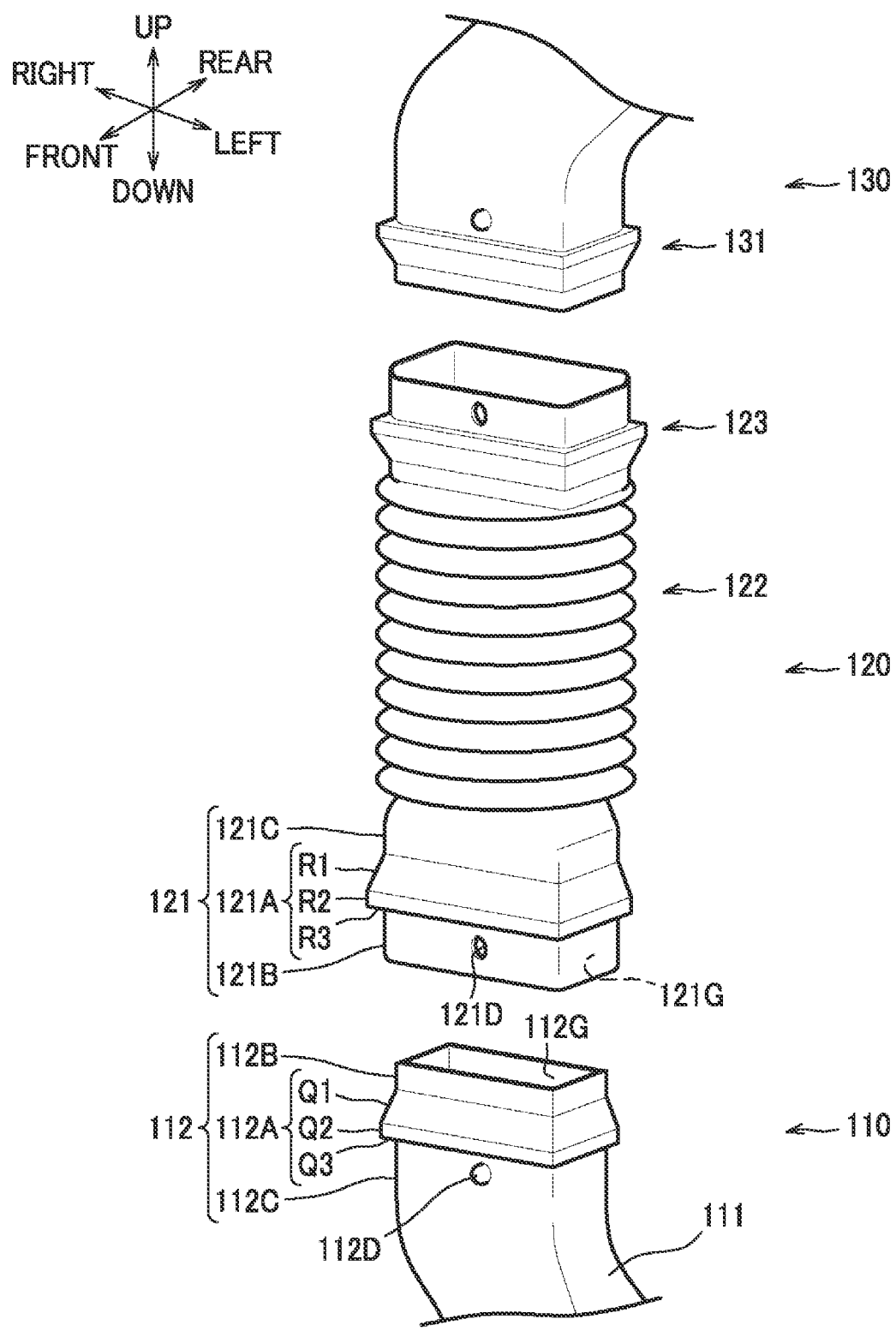
FIG. 8 is a perspective view showing a second duct and its vicinity before connection.

As shown in FIG. 8, the first connecting portion 112 of the first duct 110 has a rectangular tubular shape. The first connecting portion 112 has a rectangular cross section larger in a second direction (left-right direction) orthogonal to a first direction (front-rear direction) than in the first direction. The first connecting portion 112 includes a first annular engagement portion 112A, an end portion 112B, and a base end portion 112C.

The end portion 112B is a portion of the first duct 110 closer, than the first annular engagement portion 112A, to an extreme end of the first duct 110, and a duct opening 112G is formed in the extreme end. The end portion 112B has a constant cross-sectional shape.

The first annular engagement portion 112A extends around a whole perimeter of an outer peripheral surface of the first connecting portion 112. The first annular engagement portion 112A is shaped like a ridge formed by the outer peripheral surface protruding outward. The first annular engagement portion 112A includes an inclined portion Q1, an outwardly-enlarged portion Q2, and a retaining portion Q3.

The inclined portion Q1 is inclined with respect to the end portion 112B. The inclined portion Q1 gradually extends toward the outside of the duct (apart from a center of an internal flow path) as it extends away from the end portion 112B.

The outwardly-enlarged portion Q2 extends from the inclined portion Q1 away from the end portion 112B. The outwardly-enlarged portion Q2 has a rectangular cross-sectional shape larger than that of the end portion 112B and has a constant shape.

The retaining portion Q3 connects the outwardly-enlarged portion Q2 and the base end portion 112C. The retaining portion Q3 is orthogonal to a direction in which the body portion 111 of the first duct 110 extends.

The base end portion 112C extends from the first annular engagement portion 112A away from the end portion 112B. The base end portion 112C has a constant rectangular cross-sectional shape. The cross-sectional shape and size of the base end portion 112C is the same as those of the end portion 112B. The base end portion 112C has a protrusion 112D on a side surface extending along the second direction, that is, a surface of the longer side. The protrusion 112D protrudes outward from the base end portion 112C.

The second connecting portion 121 of the second duct 120 has a rectangular tubular shape. The second connecting portion 121 has a rectangular cross section larger in the second direction (left-right direction) orthogonal to the first direction (front-rear direction) than in the first direction. The second connecting portion 121 includes a second annular engagement portion 121A, an end portion 121B, and a base end portion 121C. Since the second connecting portion 121 is fitted on the outside of the first connecting portion 112, each of the portions of the second connecting portion 121 is sized slightly larger than those of the first connecting portion 112.

The end portion 121B is a portion of the second duct 120 closer, than the second annular engagement portion 121A, to an extreme end of the second duct 120, and a duct opening 121G is formed in the extreme end. The end portion 121B has a constant cross-sectional shape. The end portion 121B has an opening 121D in a side surface extending along the second direction, that is, a surface of the longer side. In other words, the opening 121D is formed in the side surface extending along the second direction. The opening 121D is located closer, than the second annular engagement portion 121A, to the extreme end of the second duct 120. The second annular engagement portion 121A extends around a whole perimeter of an outer peripheral surface of the second connecting portion 121. The second annular engagement portion 121A is shaped like a groove formed by the inner peripheral surface depressed inward. The second annular engagement portion 121A includes an inclined portion R1, an outwardly-enlarged portion R2, and a retaining portion R3.

The retaining portion R3 extends from the end portion 121B in a direction orthogonal to the end portion 121B so as to extend outwardly from the duct (away from the center of the internal flow path).

The outwardly-enlarged portion R2 extends from the retaining portion R3 away from the end portion 121B. The outwardly-enlarged portion R2 has a rectangular cross-sectional shape larger than that of the end portion 121B and has a constant shape.

The inclined portion R1 is inclined with respect to the end portion 121B. The inclined portion R1 tapers toward the inside of the duct (the center of the internal flow path) as it extends away from the outwardly-enlarged portion R2.

The base end portion 121C extends from the second annular engagement portion 121A away from the end portion 121B. The base end portion 121C has a constant rectangular cross-sectional shape. The cross-sectional shape and size of the base end portion 121C is the same as those of the end portion 121B.

Figure 9:
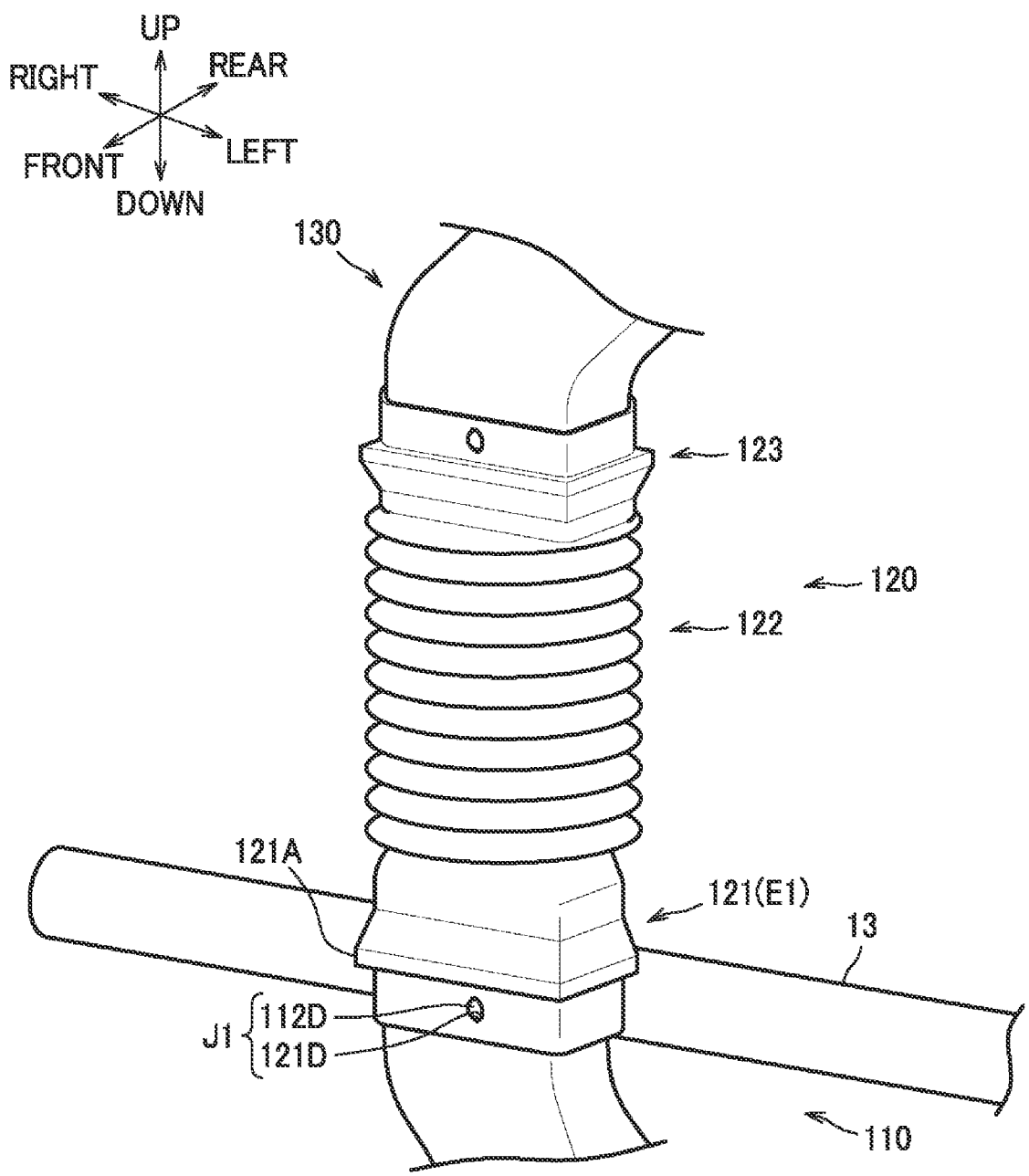
FIG. 9 is a perspective view showing the second duct and its vicinity after connection.
Figure 10:
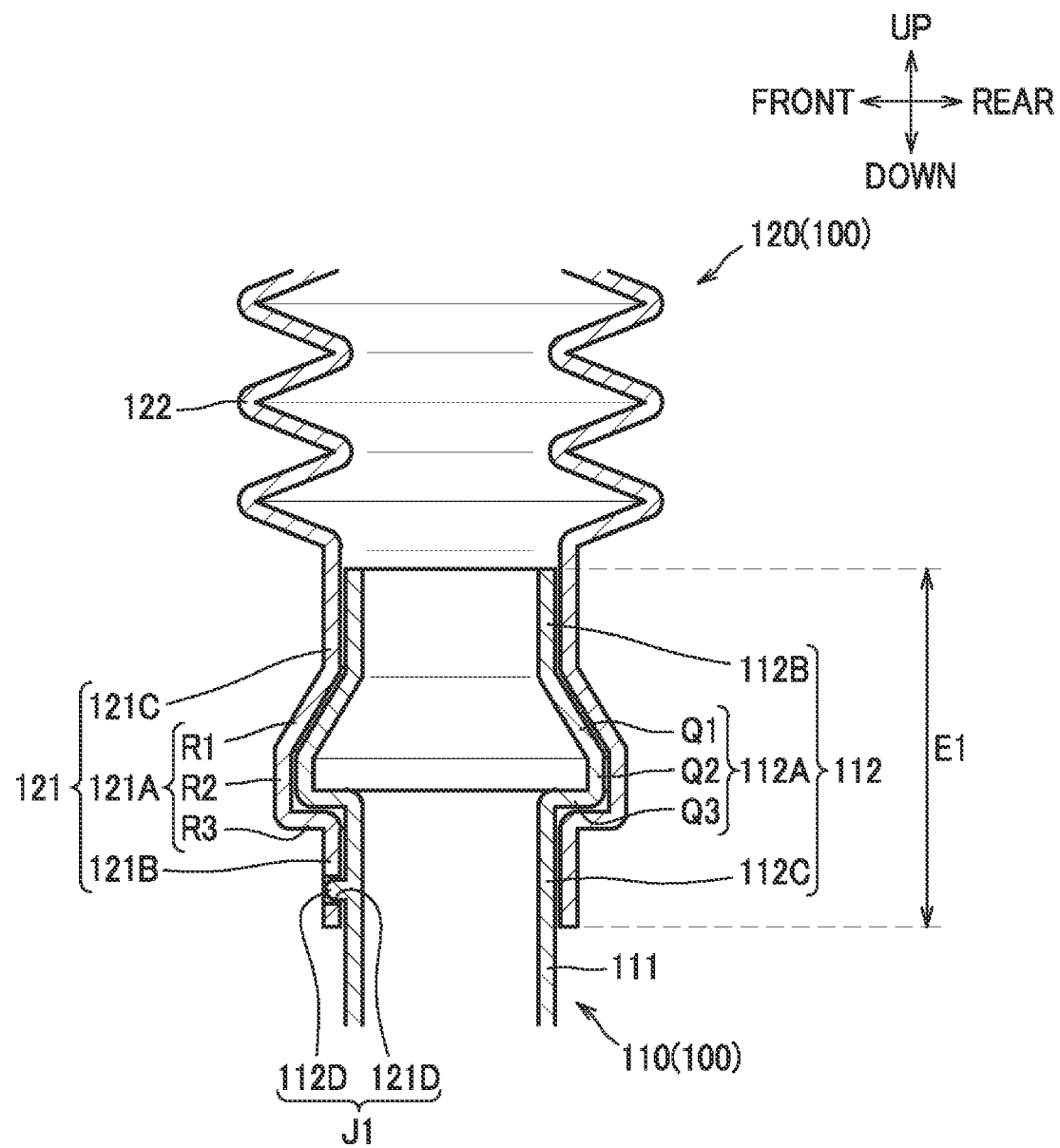
FIG. 10 is a sectional view showing a fitted portion and its vicinity of the first duct and the second duct.

When the first duct 110 is connected to the second duct, starting from the situation shown in FIG. 8, the end portion 112B of the first duct 110 is inserted into the end portion 121B of the second duct 120. When the first connecting portion 112 is pushed into the second connecting portion 121, the inclined portion Q1 of the first duct 110 contacts the end portion 121B of the second duct 120. The inclined portion Q1 acts to cause expansion of the end portion 121B and contraction of the first annular engagement portion 112A at the same time, and the first connecting portion 112 is guided into the second connecting portion 121. The first annular portion 112A and the second annular portion 121A are thereby engaged with each other as shown in FIGS. 9 and 10.

In this situation, the inclined portion R1 overlaps the inclined portion Q1, the outwardly-enlarged portion R2 overlaps the outwardly-enlarged portion Q2, and the retaining portion R3 overlaps the retaining portion Q3. In this way, hermeticity of the connection of the first duct 110 and the second duct 120 is improved by the whole perimeter fit. Further, since the retaining portion R3 overlaps the retaining portion Q3, the first duct 110 cannot be easily disengaged from the second duct 120.

When the first duct 110 and the second duct 120 are connected and the second annular engagement portion 121A and the first annular engagement portion 112A are engaged with each other, the protrusion 112D of the first connecting portion 112 is positioned in the opening 121D of the second connecting portion 121.

Since the second annular engagement portion 121A covers the first annular engagement portion 112A from outside, engagement between the first annular engagement portion 112A and the second annular engagement portion 121A cannot be visually checked directly. However, since, in the present embodiment, the protrusion 112D of the first connecting portion 112 is positioned in the opening 121D of the second connecting portion 121 when the first annular engagement portion 112A and the second annular engagement portion 121A are engaged with each other, engagement between the first annular engagement portion 112A and the second annular engagement portion 121A can be checked by visually checking that the protrusion 112D is positioned in the opening 121D. In the present embodiment, the protrusion 112D of the first duct 110 and the opening 121D formed in the second duct 120 function as an engagement confirmation portion J1 for checking engagement. That is, the engagement confirmation portion J1 includes the projection 112D and the opening 121D. The engagement confirmation portion J1 is for checking that the first annular engagement portion 112A and the second annular engagement portion 121A have been engaged with each other, and can be visually checked.

As shown in FIG. 9, the fitted portion E1 of the first duct 110 and the second duct 120 faces the rear pipe 13 (see also FIG. 2). The engagement confirmation portion J1 is formed on the surface of the fitted portion E1 that does not face the rear pipe, in this description, on the front surface, as an example.

The structure and method for connecting the third connecting portion 123 and the fourth connecting portion 131 and the effects after connection are similar to the case where the first connecting portion 112 and the second connecting portion 121 are connected, and therefore the description thereof will be omitted.

According to the above, the following advantageous effects can be obtained by the present embodiment.

According to the car seat S of the present embodiment, since the first flange 134 and the second flange 152 hold the pad P therebetween, it is possible to restrain displacement of the first tubular portion 133 of the duct 100.

If the holding member 150 were integral with the duct 100, it would be difficult to pass the second flange 152 through the hole B2; however, since the holding member 150 is formed as a member separate from the duct 100, the holding member 150 can be attached from a side of the seat back pad P2 opposite to the side facing the duct 100 and there is no need to pass the second flange 152 through the hole B2. Therefore, the duct 10 is easily attached to the pad P.

Since the first flange 134 has an inclined surface 134B inclined with respect to the first tubular portion 133, the inclined surface 134B is pressed against the pad P w % ben the first tubular portion 133 of the duct 100 is attached to the pad P. Accordingly, a portion of the pad P is locally squeezed in such a manner that a gap between the pad P and the duct 100 is eliminated whereby air leakage can be reduced.

Since the first tubular portion 133 and the second tubular portion 151 are overlapped between the first flange 134 and the second flange 152, the strength of the overlapped portions increases. Accordingly, deformation of the first tubular portion 133 and the second tubular portion 151 inside the hole B1 of the pad P can be restrained whereby airflow is stabilized.

Since the first tubular portions 133, 143 have constant cross-sectional shapes, the first tubular portions 133, 143 do not obstruct airflow. Therefore, airflow inside the first tubular portions 133, 143 is stabilized.

Since the first tubular portions 133, 143 are in contact with the inner surfaces of the holes B1, B2 of the pad P, air leakage from the connected portions of the pad P and the ducts 130, 140 can be reduced.

Since the first flanges 134, 144 include hollow spaces 134A, 144A communicating with the duct 100, the peripheries of the hollow spaces 134A, 144A of the duct become more flexible. As a result, an adverse effect on the flexibility of the pad P can be restrained.

Since the third flanges 153 of the holding members 150 are positioned in the hollow spaces 134A, 144A, disengagement of the holding members 150 from the duct 100 can be restrained.

Since the fourth duct 140 is configured such that the bellows 142 includes the first flange 144, the periphery of the flange 144 becomes more flexible. Accordingly, an adverse effect on the flexibility of the pad P can be restrained.

Since engagement of the first annular engagement portion 112A and the second annular engagement portion 121A can be visually checked when the first duct 110 and the second duct 120 are fitted by a whole perimeter fit, it will be easy to properly connect the first duct 110 and the second duct 120 whereby hermeticity of the duct can be insured.

Since the first annular engagement portion 112A is shaped like a ridge formed by the protruding outer peripheral surface protruding outward and the second annular engagement portion 121A is shaped like a groove formed by the inner peripheral surface depressed inward, obstruction of airflow inside the duct by the first annular engagement portion 112A and the second annular engagement portion 121A can be reduced.

Since the engagement confirmation portion J1 includes an opening 121D formed in the second duct 120 and a protrusion 112D located on the first duct 110, the proper engagement of the first annular engagement portion 112A and the second annular engagement portion 121A can be checked by visually observing that the protrusion 112D is positioned in the opening 121D.

Since the opening 121D is formed in the side extending along the second direction, that is, in the broader side of the second duct 120, reduction of strength of the duct 100 can be restrained compared to the case where the opening 121D is formed the narrower side.

The opening 121D is formed in the end portion 121B of the second connecting portion 121. That is, the opening 121D is located closer, than the second annular engagement portion 121A, to the extreme end of the second duct 120, and therefore air leakage from the connected portions of the duct 100 can be reduced (see FIG. 10).

Since the second duct 120 includes a bellows 122 that is extendable and contractable, the second duct 120 becomes more bendable and flexible whereby an adverse effect on the flexibility of the pad P can be restrained.

The engagement confirmation portion J1 is formed on the surface of the fitted portion E1 of the first duct 110 and the second duct 120 that does not face the rear pipe 13. Accordingly, the engagement confirmation portion J1 is not hidden by the rear pipe 13; therefore it is easy to visually observe the engagement confirmation portion J1 during assembly or other operations.

Although the first embodiment has been described above, specific configurations may be modified where appropriate, as will be described below. In the following description, the same reference characters will be applied to structures similar to those of the above embodiment and explanation will be omitted as appropriate, and structures different from those of the above embodiment will be described in detail.

Although the first flange in the above-described embodiment includes a hollow space communicating with the duct, the first flange does not have to include a hollow space. Further, although the holding member includes a third flange, the third flange can be omitted.

Figure 11:
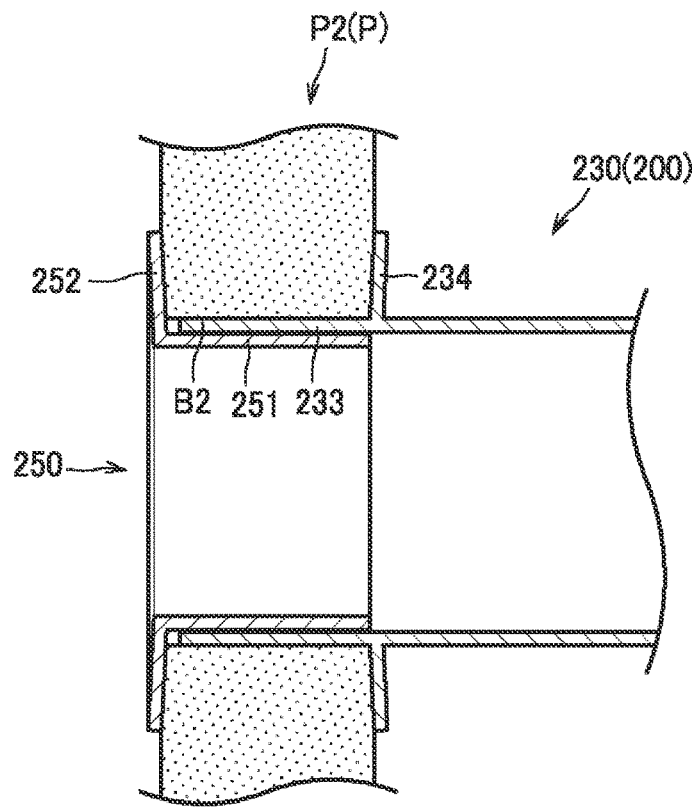
FIG. 11 is a sectional view of a connected portion of a duct of a first modified example.

For example, as shown in FIG. 11, a third duct 230 of a first modified example includes a first tubular portion 233 and a first flange 234. The first flange 234 has a plate-like shape and extends outward from the first tubular portion 233. A holding member 250 includes a second tubular portion 251 and a second flange 252. The first tubular portion 233 and the second tubular portion 251 are fixed by bonding using an adhesive, for example. It is also preferable in this embodiment to fix the first tubular portion 233 and the second tubular portion 251 in such a manner that the first flange 234 and the second flange 252 hold the pad P therebetween. In this way, the duct 200 is stably held in the pad P.

Figure 12:
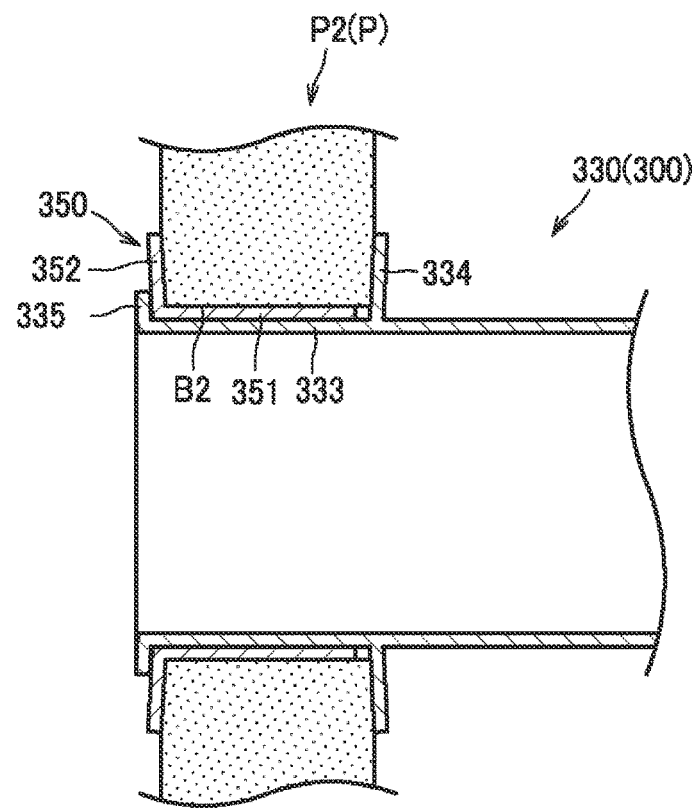
FIG. 12 is a sectional view of a connected portion of a duct of a second modified example.

Although the holding member in the above-described embodiment is fitted in the inside of the duct, the holding member may be fitted on the outside of the duct. For example, in a second modified example shown in FIG. 12, a holding member 350 is fitted on the outside of a third duct 330. The third duct 330 includes a first tubular portion 333, a plate-shaped first flange 334, and a third flange 335. The first tubular portion 333 is sized slightly smaller than a second tubular portion 351 of a holding member 350 such that the third duct 330 is positioned inside the holding member 350. The third flange 335 extends outward from an extreme end of the first tubular portion 333.

According to this configuration, the third duct 330 is attached by positioning the holding member 350 in the hole B2 of the seat back pad P2 first, and then positioning the first tubular portion 333 of the third duct 330 inside the holding member 350. The third duct 330 is stably held as a result of engagement of the third flange 335 with the second flange 352 of the holding member 350.

Figure 13:
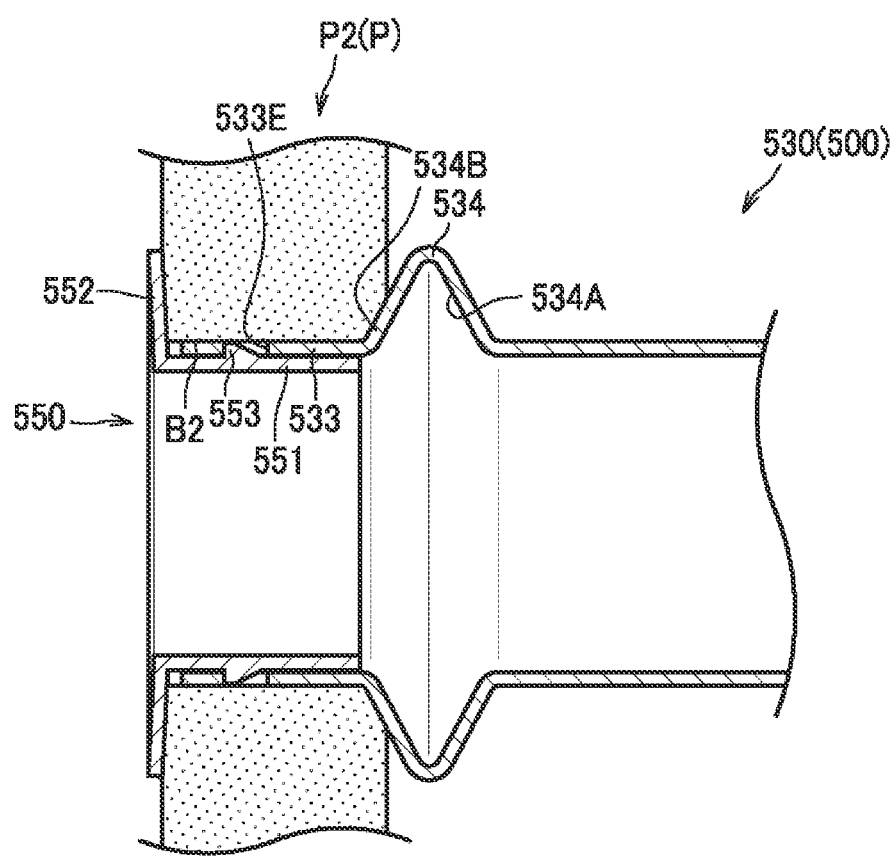
FIG. 13 is a sectional view of a connected portion of a duct of a third modified example.

Although the third flange of the holding member in the above-described embodiment enters the hollow space and is engaged with the first flange, a part of the holding member other than the flange may engage a portion of the duct. For example, in a third modified example shown in FIG. 13, a holding member 550 includes a second tubular portion 551, a second flange 552, and a lug 553. The lug 553 protrudes outward from the second tubular portion 551. The lug 553 is engaged with an engagement hole 533E formed in a first tubular portion 533. Accordingly, the holding member 550 is connected (fixed) so that it will not be disengaged from the duct.

Although the engagement confirmation portion in the above-described embodiment includes a protrusion formed on the first duct as a marker, the engagement confirmation portion may be configured as a portion that does not include a marker like a protrusion.

Figure 14:
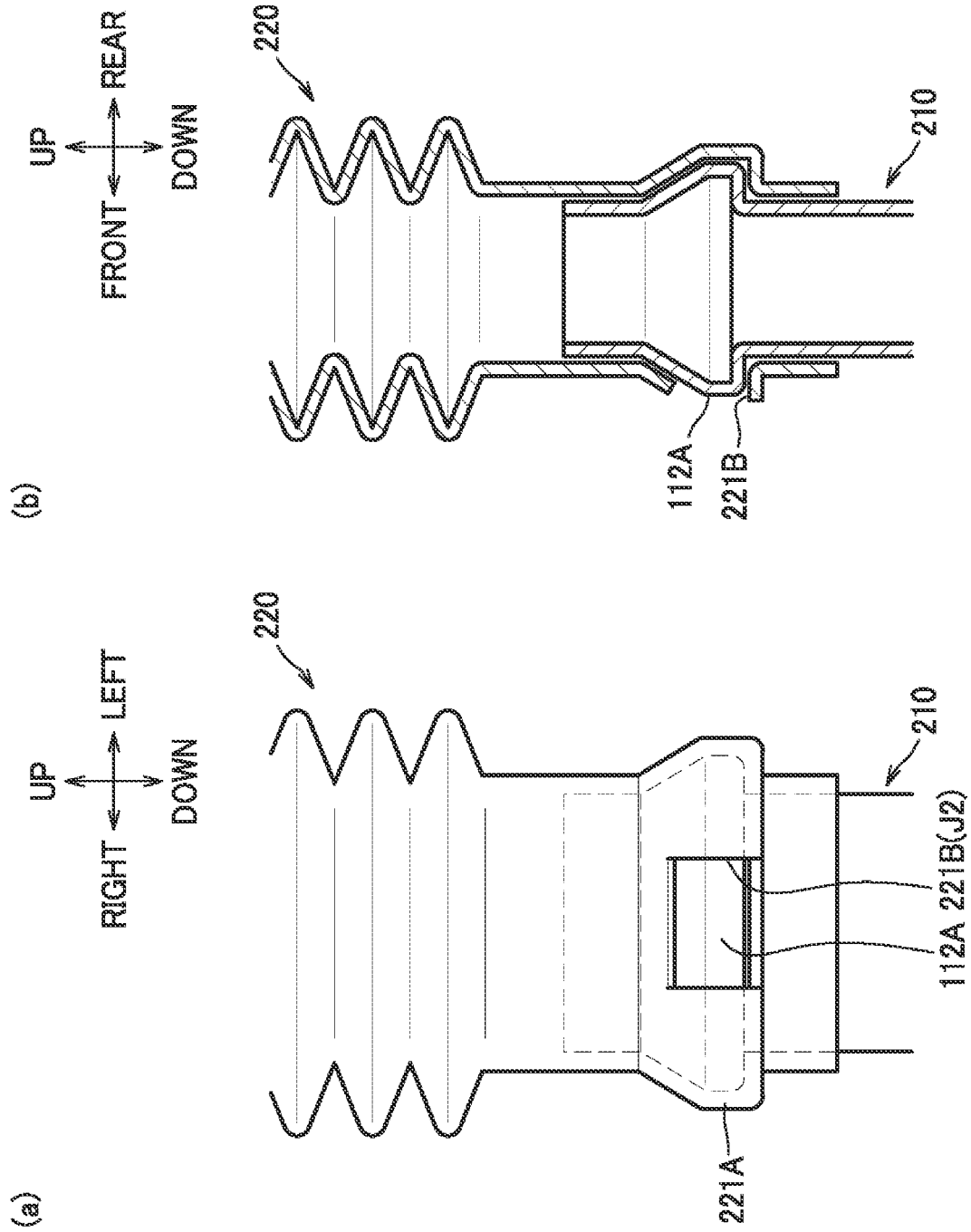
FIG. 14 includes a front view (a) and a right side view (b) of a fitted portion and its vicinity of a duct of a fourth modified example.

For example, in a first modified example shown in FIGS. 14(a) and 14(b), an opening 221B is formed such that engagement of the first annular engagement portion 112A and the second annular engagement portion 221A can be visually checked directly. Specifically, a first duct 210 does not have a structure that forms a marker such as a protrusion. On the other hand, a second duct 220 is configured such that an opening 221B as an engagement confirmation portion J2 is formed on a part of a second annular engagement portion 221A. More specifically, the opening 221B is formed in a part of the periphery of the second annular engagement portion 221A. Further, the opening 221B is formed in a part of the second duct 220 extending lengthwise. Accordingly, when the first duct 210 and the second duct 220 are connected, a part of the first annular engagement portion 112A is exposed through the opening 221B once the first annular engagement portion 112A and the second annular engagement portion 121A are engaged with each other. Therefore, it is possible to visually observe the first annular engagement portion 112A through the opening 221B to check engagement of the first annular engagement portion 112A and the second annular engagement portion 221. According to this configuration, since it is not necessary to form a protrusion or the like on the first duct 210 for checking engagement, it is possible to simplify the structure of the first duct 210.

The engagement confirmation portion may be a marker formed on the first duct.

For example, an engagement confirmation portion J3 of a second modified example shown in FIG. 15 is a line 340 formed on a first duct 310 as a marker. As shown in FIG. 15(a), the first duct 310 is configured such that a base end portion 312C of a first connecting portion 312 is slightly thicker than a body portion 111. Accordingly, the line 340 is marked by a step between the body portion 111 and the base end portion 312C.

The line 340 is positioned farther, than the first annular engagement portion 112A, from the extreme end of the first duct 310. The distance L1 from the first annular engagement portion 112A to the line 340 is shorter than the distance L2 from the second annular engagement portion 121A to the extreme end of the second duct 320.

As shown in FIG. 15(b), when the first annular engagement portion 112A and the second annular engagement portion 121A are engaged with each other, the line 340 is covered by an end portion 321B of the second duct 320. The distance L3 from the line 340 to the extreme end of the second duct 320 is shorter than the distance L4 from the line 340 to the first annular engagement portion 312A. That is, as soon as the first annular engagement portion 112A and the second annular engagement portion 121A are engaged with each other and the first duct 310 and the second duct 320 are connected, the line is covered with the second duct 320. Therefore, if the line 340 is covered with the second duct 320, it is likely that the first annular engagement portion 112A and the second annular engagement portion 121A are properly engaged with each other whereby hermeticity of the duct 100 can be more reliably ensured.

Engagement of the first annular engagement portion 112A and the second annular engagement portion 121A can also be checked in this second modified example, by visually observing that the line 340 is covered with the second duct 320 when the first duct 310 and the second duct 320 are connected by a whole perimeter fit.

The engagement confirmation portion may be a structure including a marker formed on the first duct and a window formed in the second duct.

Figure 16:
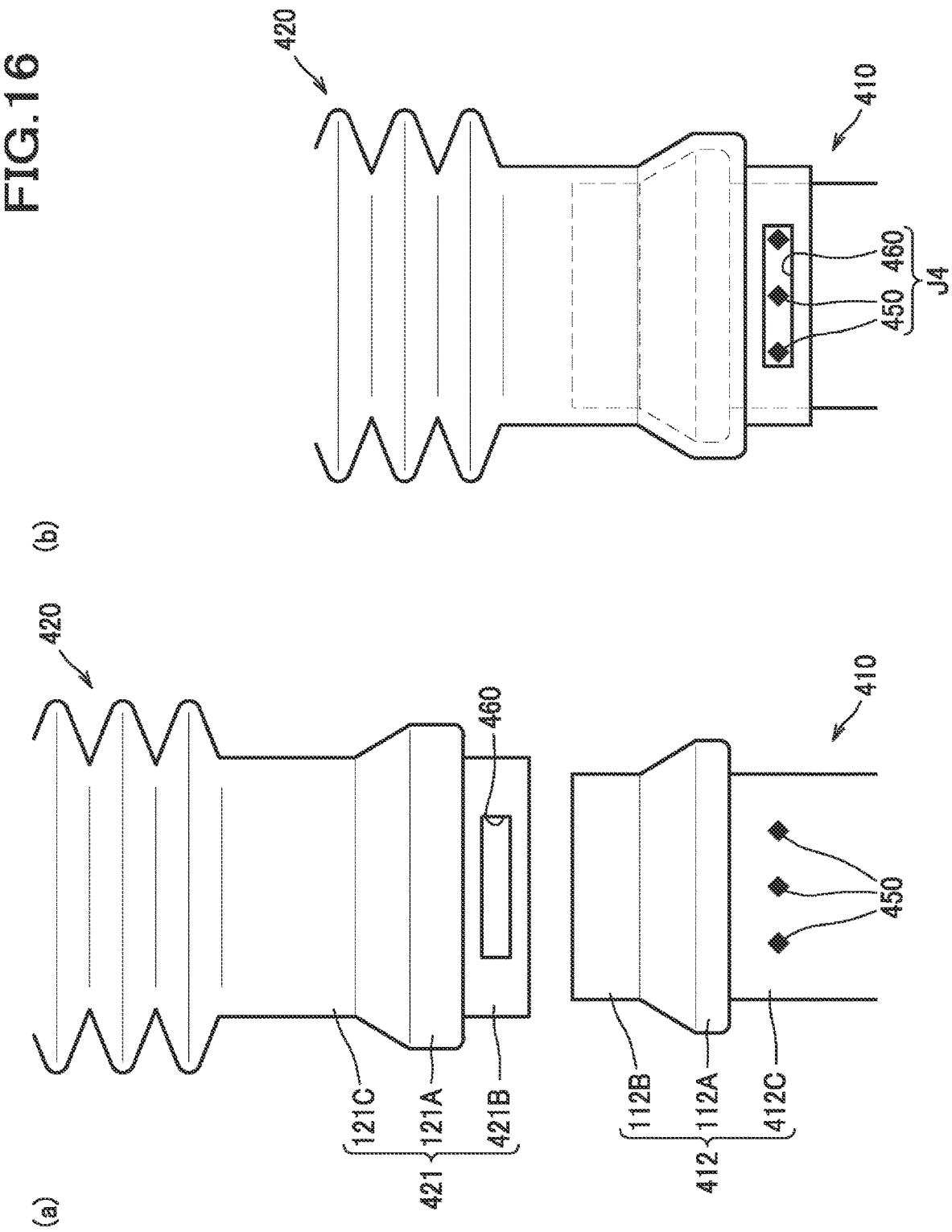
FIG. 16 includes sectional views of a fitted portion and its vicinity of a duct of a sixth modified example before it is fitted (a) and after it is fitted (b).

For example, as shown in FIGS. 16(a) and 16(b), an engagement confirmation portion J4 of a third modified example includes a window 460 formed in a second duct 420, and a printed symbol 450 as an example of a marker on the first duct 410. The window 460 may be configured as an opening (through hole), or may be formed of transparent plastic or a thin film. The symbol 450 is not limited to any indication method or to any shape as long as it can be visually identified through the window 460. According to this configuration, the symbol 450 is provided on a base end portion 412C of a first connecting portion 412. The window 460 is provided on an end portion 421B of a second connecting portion 421. As shown in FIG. 16(b), when a first annular engagement portion 412A and a second annular engagement portion 421A are engaged with each other, the symbol 450 is positioned to be visually identifiable through the window 460. According to this configuration, if the whole symbol is inside the window 460, it is assumed that the first annular engagement portion 112A and the second annular engagement portion 121A are properly engaged with each other. However, depending on the marker and the shape of the opening, the first annular engagement portion and the second annular engagement portion may be assumed to be properly engaged with each other if at least a part of the marker can be viewed through the opening.

Figure 17:
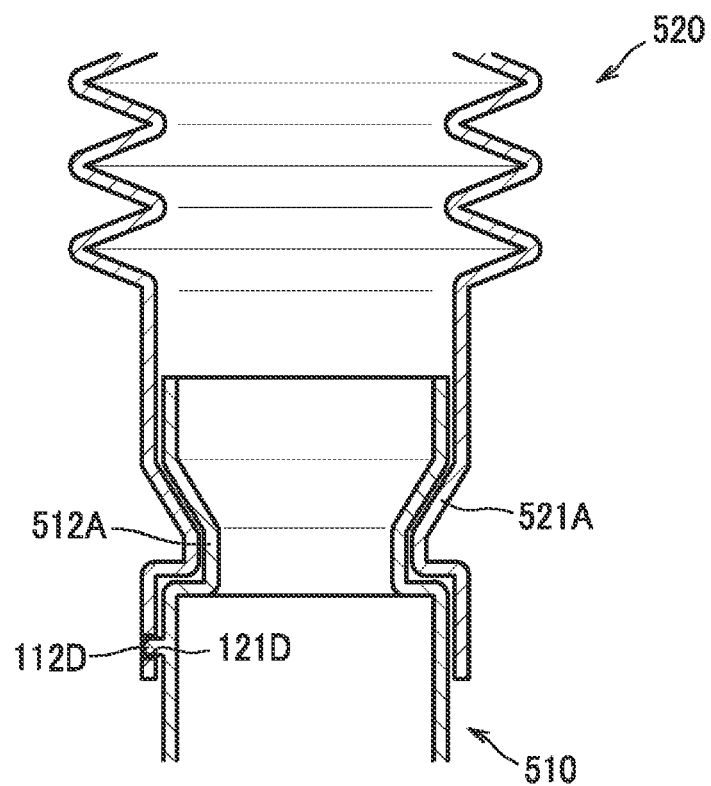
FIG. 17 is a sectional view of a fitted portion and its vicinity of a duct of a seventh modified example.

In the above-described embodiment, the first annular engagement portion is shaped like a ridge formed by the outer peripheral surface protruding outward, and the second annular engagement portion is shaped like a groove formed by the inner peripheral surface depressed inward; however, as in a fourth modified example shown in FIG. 17, a first annular engagement portion 512A of a first duct 510 may have a depressed groove shape on an outer peripheral surface, and a second annular engagement portion 521A of a second duct 520 may have a protruding ridge shape on an inner peripheral surface.

Although the cross section of each duct and each connecting portion in the above-described embodiment has a rectangular shape, it is not limited to a rectangular shape and may have a circular, oval, polygonal or other shapes.

Although the opening 121D in the above-described embodiment is formed in the end portion 121B of the second connecting portion 121, this opening may be a notch extending to an edge (for example, the lower end of the end portion 121B shown in FIG. 8) of the second duct 120.

Next, a second embodiment of a vehicle seat will be described.

The vehicle seat of the present embodiment, similar to the first embodiment, is configured as a car seat S to be installed in an automobile, and includes a seat cushion S1, a seat back S2, and a head rest S3 (see FIG. 1).

Figure 18:
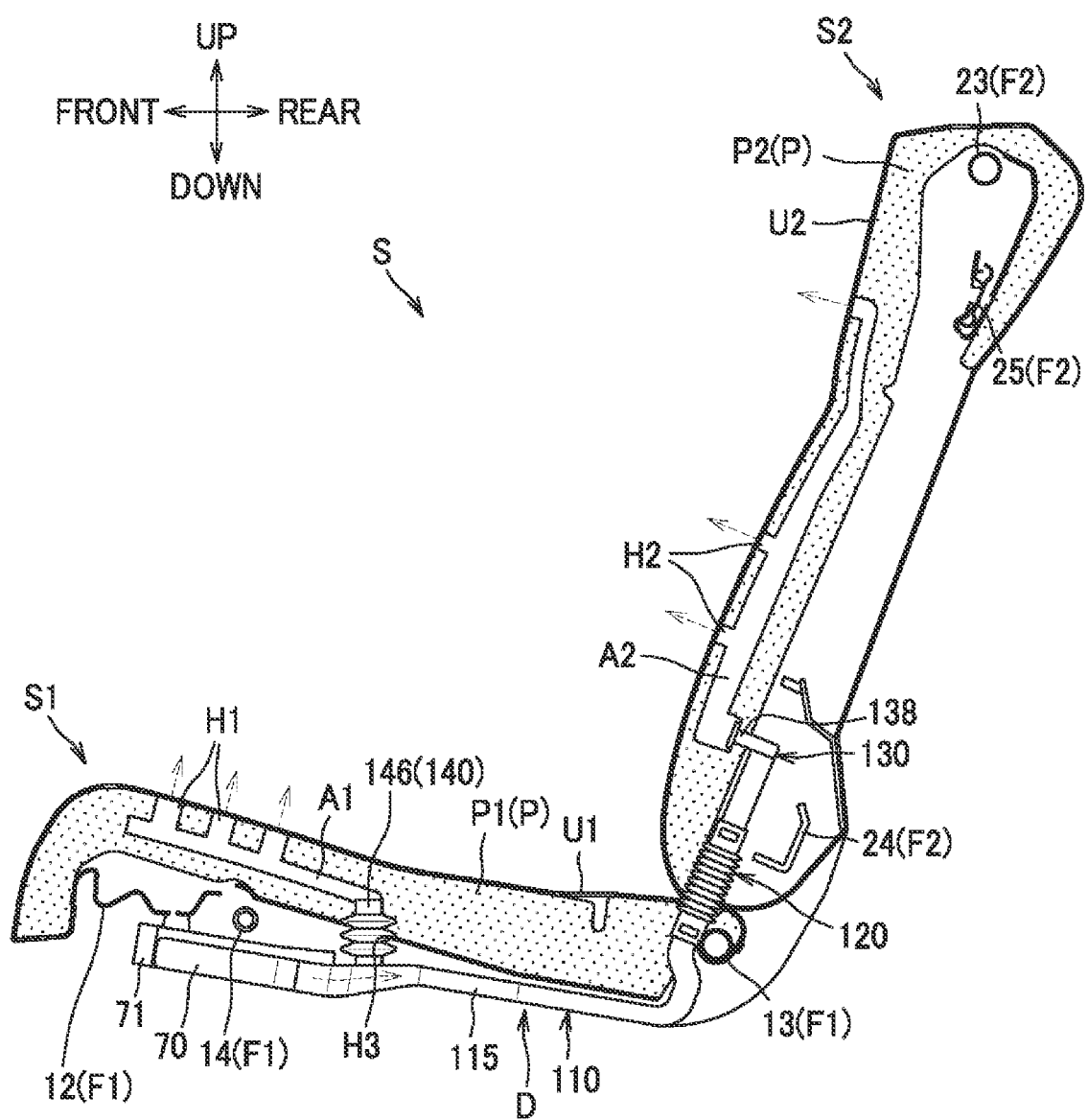
FIG. 18 is a sectional view of a car seat according to a second embodiment.

As shown in FIG. 18, the car seat S is formed by overlaying a pad P made of urethane foam or the like and outer coverings U1, U2 made of fabrics, leather or the like on a seat frame F (see FIG. 19) as a frame member. The pad P covers the seat frame F, and the outer coverings U1, US cover the pad P.

The pad P includes a seat cushion pad P1 which constitutes a pad of the seat cushion S1, and a seat back pad P2 which constitutes a pad of the seat back S2. The seat cushion pad P1 includes an air passage A1 formed therein, and a plurality of ventilation holes H1 communicating with the air passage A1 from an upper surface. The seat back pad P2 includes an air passage A2 formed therein, and a plurality of ventilation holes H2 communicating with the air passage A2 from a front surface.

The air passages A1, A2 are connected to a blower 70 via a duct D which will be described later. The blower 70 is a sirocco fan, and is disposed under a pan frame 12 which will be described later. The blower 70 is attached to the pan frame 12 via a bracket 71. The car seat 70 is configured to deliver air from the blower 70 through the duct D and the air passages A1, A2, and to blow out the air through the ventilation holes H1, H2 toward an occupant seated on the seat.

Figure 19:
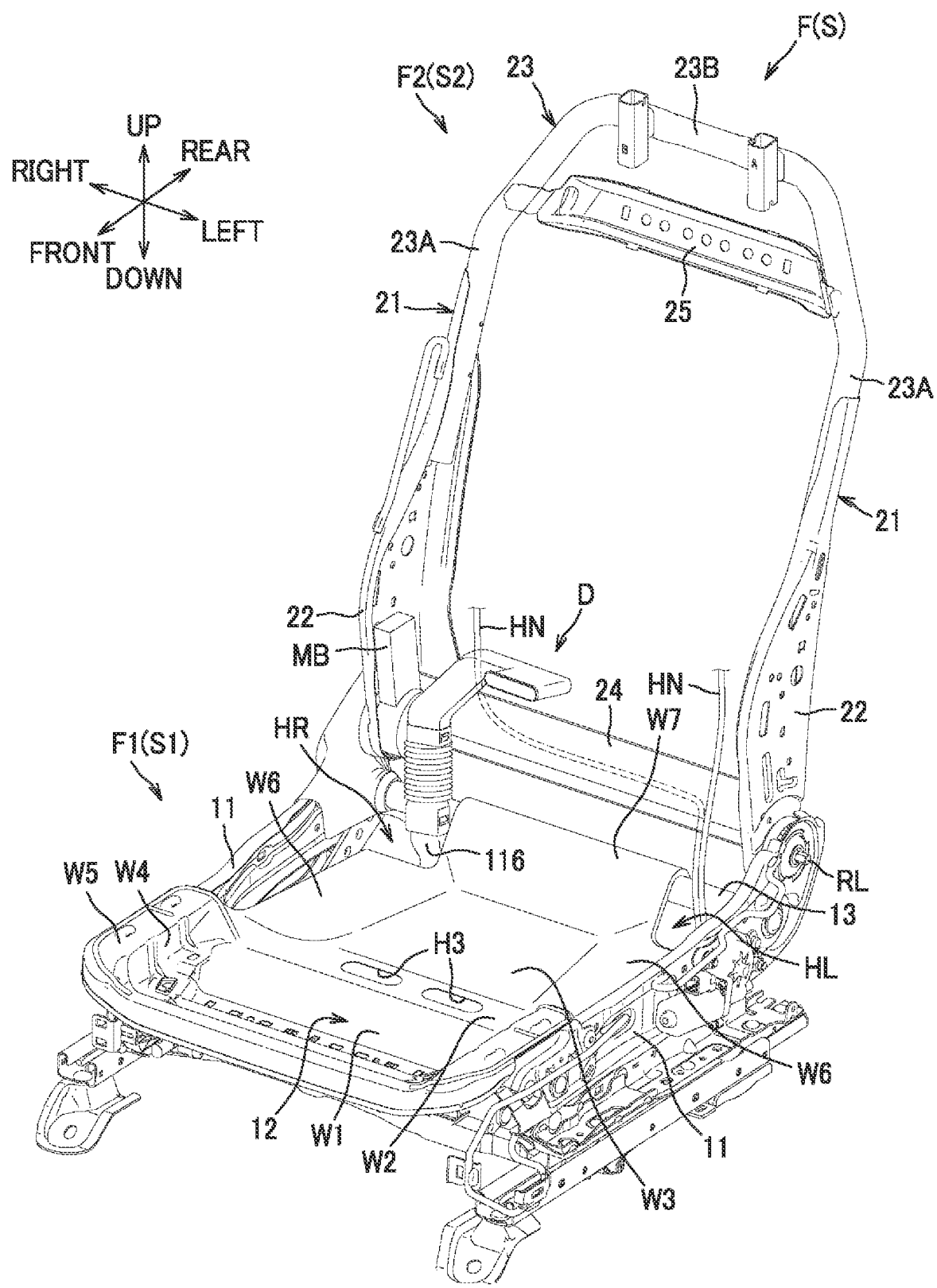
FIG. 19 is a perspective view of a seat frame.

As shown in FIG. 19, the seat frame F includes a seat cushion frame F1 which constitutes a frame of the seat cushion S1, and a seat back frame F2 which constitutes a frame of the seat back S2. The seat cushion S1 is formed by covering the seat cushion frame F1 with the seat cushion pad P1 and the covering U1, and the seat back S2 is formed by covering the seat back frame F2 with the seat back pad P2 and the covering U2 (see FIG. 1).

Figure 21:
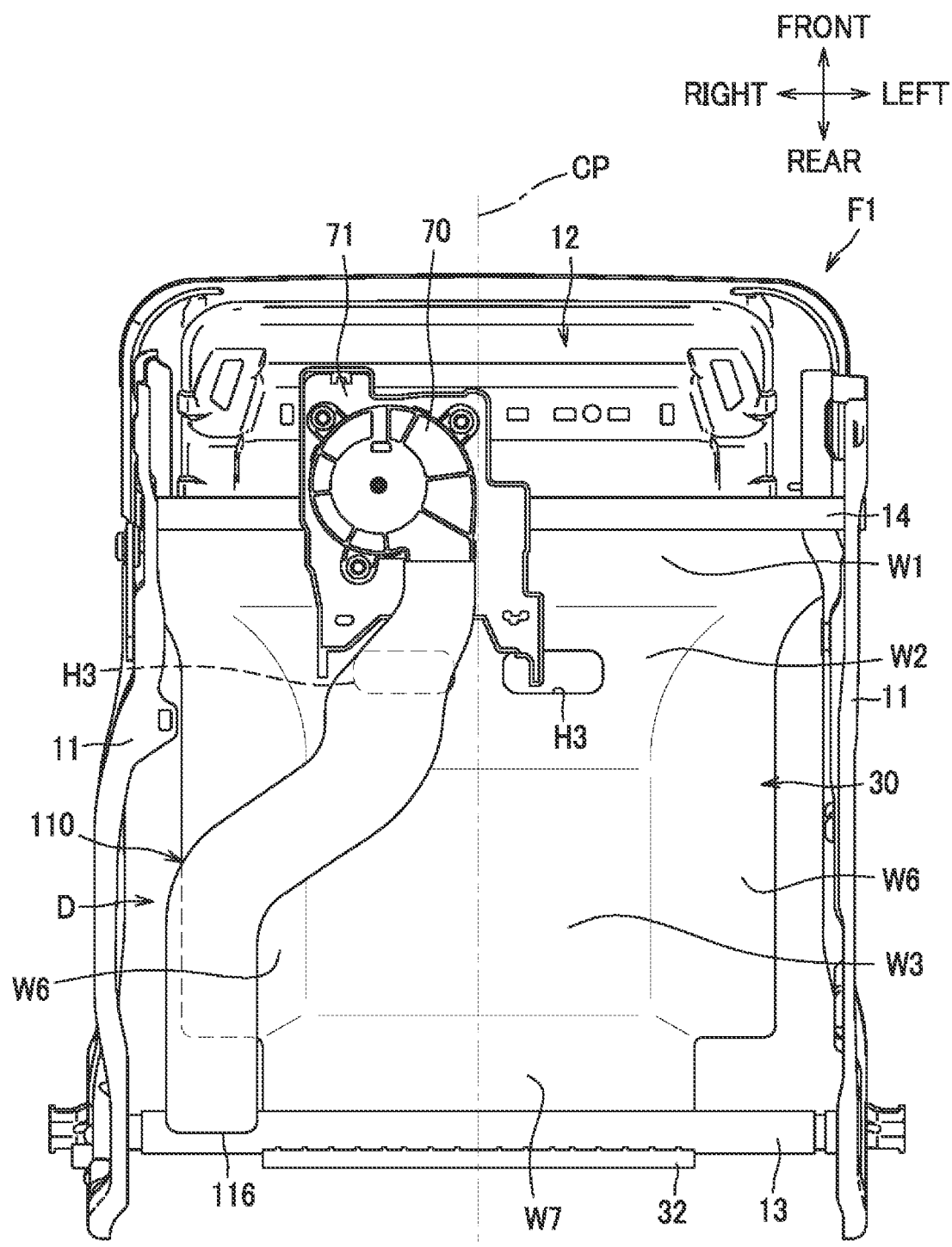
FIG. 21 is a view of a seat cushion frame, a blower, and the duct as seen from below.

The seat cushion frame F1 includes left and right cushion side frames 11, a pan frame 12 as a pressure-receiving member, a rear pipe 13 as a rear frame, and a front pipe 14 (see FIG. 21). The left and right cushion side frames 11 are members constituting left and right frames of the seat cushion S1, and are located apart from and face each other in the lateral direction. The cushion side frames 11 are made of sheet metal, and are each formed in a shape elongated in the front-rear direction.

The pan frame 12 is a plate-like member that receives a load from an occupant seated on the seat. The lateral width of the pan frame 12 is equal to or greater than half the length of the rear pipe 13. The pan frame 12 is made of sheet metal and is supported by the left and right cushion side frames 11, the rear pipe 13, and the front pipe 14. The structure of the pan frame 12 will be described in detail later.

As shown in FIG. 21, the rear pipe 13 and the front pipe 14 are made of metal piping material, are located apart from each other in the front-rear direction, and connect the left and right cushion side frames 11. To be more specific, the rear pipe 13 connects the rear portions of the left and right cushion side frames 11, and the front pipe 14 connects the front portions of the left and right cushion side frames 11. The duct D is positioned on the right side (on one side of the seat cushion S1 in the lateral direction) with respect to the center (center plane CP) of the seat cushion S1 in the lateral direction.

As shown in FIG. 19, the seat back frame F2 includes left and right sheet-metal frames 22, a pipe frame 23, a lower frame 24, and a bridging frame 25. The left and right sheet-metal frames 22 are located apart from and face each other in the lateral direction. The sheet-metal frames 22 are made of sheet metal and are each formed in a shape elongated in the up-down direction.

The pipe frame 23 is made of metal piping material, and includes left and right upper side frames 23A extending substantially in the up-down direction, and an upper frame 23B that connects upper ends of the upper side frames 23A. The left and right upper side frames 23A of which lower portions are connected to upper portions of the sheet-metal frames 22 form, together with the left and right sheet-metal frames 22, left and right back side frames 21 constituting left and right frames of the seat back S2. The lower frame 24 is made of sheet metal, and is configured to connect lower portions of the left and right back side frames 21. The bridging frame 25 is made of sheet metal, and is configured to connect upper portions of the left and right back side frames 21.

Rear portions of the cushion side frames 11 and lower portions of the back side frames 21 are rotatably linked via a reclining mechanism RL. The car seat S is thereby configured such that the seat back S2 is tiltable relative to the seat cushion S1 frontward and rearward.

The right side sheet-metal frame 22 is provided with a motor bracket MB in which a motor for driving the reclining mechanism RL is incorporated. The duct D may or may not be in contact with the motor bracket MB.

Harnesses HN are attached to the seat back S2. The harnesses HD connect electrical components such as a motor for driving the reclining mechanism RL to a power supply located outside the car seat S. The harnesses HN are routed along the left side portion and the right side portion of the seat back S2 from an upper portion to a lower portion, bound together in a bundle at the lower left side of the seat back S2, and extend downward.

The pan frame 12 includes a front side bottom wall W1, a central bottom wall W2, a rear side bottom wall W3, vertical walls W4, a flange W5, inclined walls W6, and a rear wall W7. The front side bottom wall W1 extends substantially in a horizontal direction and is positioned in the front portion of the cushion side frame 11.

The vertical walls W4 extend upward from the front end and from the left and right ends of the front side bottom wall W1. The flange W5 extends outward (in a direction away from the front side bottom wall W1 in the horizontal direction) from the front, left and right vertical walls W4. The flange W5 is joined to front portions of the cushion side frames 11.

The central bottom wall W2 extends from a rear end of the front side bottom wall W1 in an obliquely rearward-and-downward direction. The central bottom wall W2 has a hole H3 through which a part of the duct D (a fourth duct 140 which will be described later) extends. Two holes H3 are symmetrically provided with respect to a center of the central bottom wall W2 in the lateral direction. In this embodiment, a right side hole H3 is used since the duct D is located on the right side of the car seat S, but a left side hole H3 may be used in a type of the car seat S with a duct D located on the left side thereof.

The rear side bottom wall W3 extends rearward from the rear end of the central bottom wall W2. The rear side bottom wall W3 is located in a position corresponding to the buttocks of an occupant, and supports the buttocks of the occupant via the seat cushion pad P1, etc.

The inclined walls W6 are provided on the left and right sides of the rear side bottom wall W3. The inclined walls W6 extend respectively from the left and right ends of the rear side bottom wall W3 in obliquely laterally-outward-and-upward directions. The left and right inclined walls W6 are located in positions corresponding to the left and right sides of the buttocks of the occupant, and support the left and right sides of the buttocks of the occupant via the seat cushion pad P1, etc.

Each inclined wall W6 is smoothly joined with the central bottom wall W2 and the rear wall W7. Each inclined wall W6 is located apart from the rear pipe 13 in the front-rear direction.

The rear wall W7 extends from the rear end of the rear side bottom wall W3 in an obliquely rearward-and-upward direction. The rear end of the rear wall W7 is formed in a shape of a hook wrapped around an outer peripheral surface of the rear pipe 13 and is engaged with the rear pipe 13 from above.

The rear wall W7 has a lateral width smaller than the length of the rear pipe 13, and is located at a center of the rear pipe 13 in the lateral direction. The rear wall W7 is thereby located apart from the cushion side frames 11 in the lateral direction.

By the pan frame 12 being configured as described above, holes HR, HL passing through the seat cushion frame F1 in the up-down direction are formed at the left and right of a rear portion of the pan frame 12. Specifically, each of the holes HR, HL is formed by a rear end of the inclined wall W6, a right or left end of the rear wall W7, the rear pipe 13, and the cushion side frame 11 surrounding the holes HR, HL.

A part of the duct D (a part thereof extending from the seat cushion S1 toward the seat back S2, specifically, a curved tubular portion 116 described later) described later passes through the right hole HR. That is, the duct D is arranged around the pan frame 12. In this embodiment, the curved tubular portion 116 of the duct D is not in contact with the pan frame 12. The harnesses HN described above extend through the left hole HL.

In other words, the part of the duct D is located between the rear pipe 13 and the right side inclined wall W6 of the pan frame 12. Further, the part of the duct D is located between the right cushion side frame 11 and the rear wall W7 of the pan frame 12. The harnesses HN are located between the left cushion side frame 11 and the rear wall W7 of the pan frame 12. In this embodiment, the part of the duct D is not in contact with the pan frame 12 or the cushion side frame 11.

Figure 20:
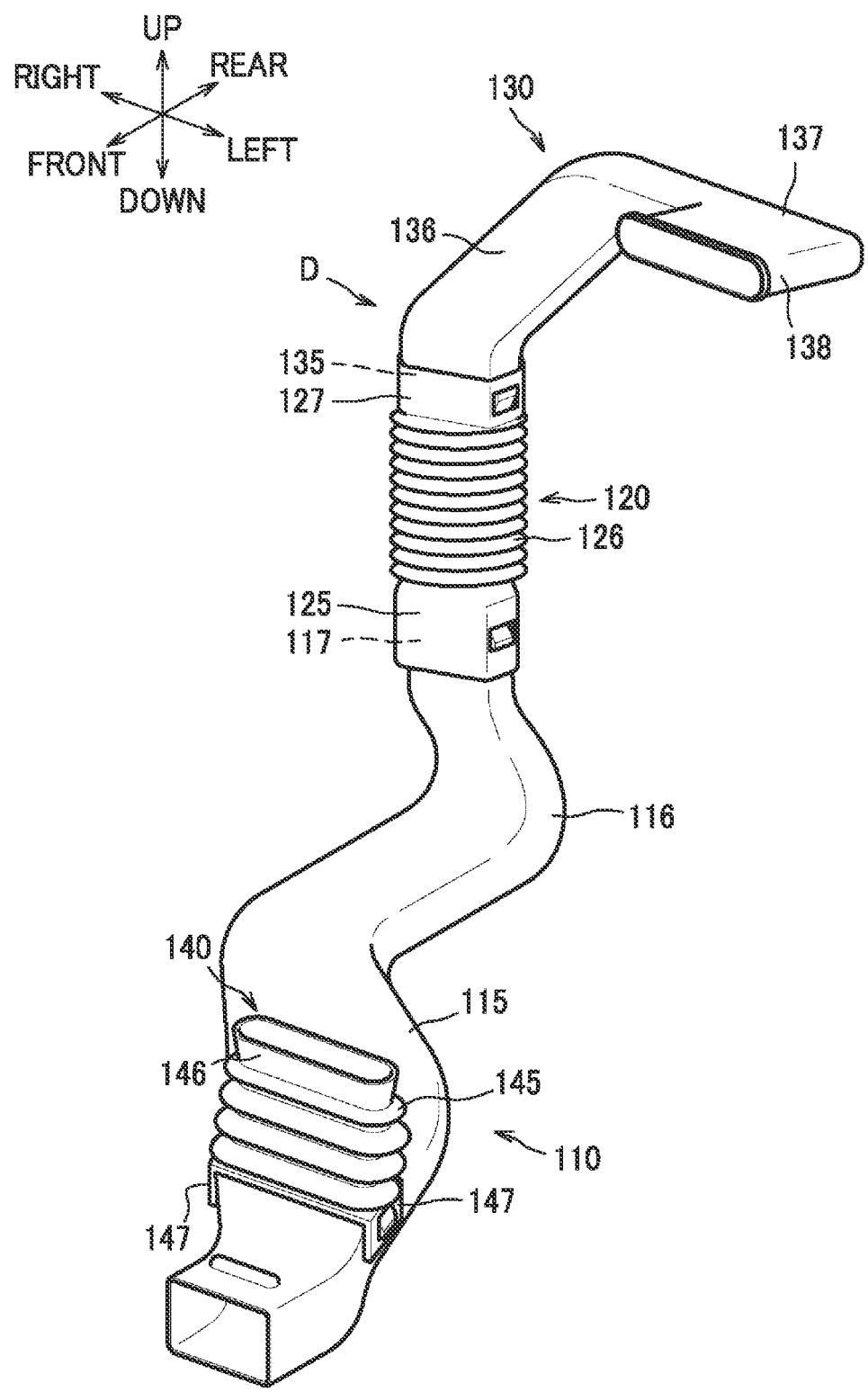
FIG. 20 is a perspective view of a duct.

As shown in FIG. 18, the duct D is a member that connects the air passages A1, A2 formed in the pads P (P1, P2) of the seat cushion S1 and the seat back S2, and the blower 70. The duct D is formed by connecting a plurality of parts. To be more specific, as shown in FIG. 20, the duct D includes a first duct 110, a second duct 120, a third duct 130, and a fourth duct 140.

The first duct 110 includes a lower tubular portion 115 extending substantially in the front-rear direction, a curved tubular portion 116 curving upward from the rear end of the lower tubular portion 115 in a rearward-protruding shape, and a first connecting tubular portion 117 extending substantially upward from an upper end of the curved tubular portion 116. The lower tubular portion 115 has a front end portion connected to the blower 70 (see FIG. 18).

The second duct 120 is connected to a rear portion of the first duct 110 and extends substantially in the up-down direction. The second duct 120 includes a second connecting tubular portion 125, a first bellows 126 as a flexible portion provided above the second connecting tubular portion 125, and a third connecting tubular portion 127 provided above the first bellows 126. The second connecting tubular portion 125 is sized such that the first connecting tubular portion 117 of the first duct 110 is fitted therein. The first bellows 126 is flexible and is extendable and contractable.

The third duct 130 is connected to an upper end of the second duct 120. The third duct 130 includes a fourth connecting tubular portion 135 extending substantially in the up-down direction, a first upper tubular portion 136 extending from an upper end of the fourth connecting tubular portion 135 in an obliquely leftward-and-upward direction (an obliquely upward direction toward a center of the car seat S in the lateral direction), a second upper tubular portion 137 extending toward the left (the center of the car seat S in the lateral direction) from an upper end of the first upper tubular portion 136, and a back connecting tubular portion 138 extending substantially frontward from the second upper tubular portion 137. The fourth connecting tubular portion 135 is sized to fit inside the third connecting tubular portion 127. The back connecting tubular portion 138 has a frontward end connected to the air passage A2 formed in the seat back pad P2 (see FIG. 18).

The fourth duct 140 is connected to a front portion of the first duct 110 and extends substantially in the up-down direction. The fourth duct 140 includes a second bellows 145, a cushion connecting tubular portion 146 provided above the second bellows 145, and left and right connecting wall portions 147 provided below the second bellows 145. The second bellows 145 has flexibility and is extendable and contractable. The cushion connecting tubular portion 146 is connected to the air passage A1 formed in the seat cushion pad P1 (see FIG. 18). The connecting wall portions 147 extend downward from lower ends of the second bellows, and are configured to hold, from the right and left, the lower tubular portion 115 of the first duct 110 therebetween. In this embodiment, the duct D is supported by the blower 70 to which the duct D is connected, the seat cushion pad P1, and the seat back pad P2, and is not fixed to the pan frame 12.

As shown in FIG. 18, the duct D is disposed across the seat cushion S1 and the seat back S2. Specifically, the duct D is configured such that the first duct 110 and the fourth duct 140 are disposed on the seat cushion S1, the third duct 130 is disposed on the seat back S2, and the second duct 120 is disposed across the seat cushion S1 and the seat back S2. The duct D is in contact with the rear pipe 13. However, the duct D does not have to be in contact with the rear pipe 13.

The car seat S of the present embodiment configured as above provides the following advantageous effects.

Since the duct D is arranged around the pan frame 12, interference between the pan frame 12 and the duct D and wear of the pan frame 12 or the duct D which may be caused thereby can be reduced.

Since the duct D is arranged between the rear pipe 13 and the pan frame 12, the duct D can be arranged in the space between the rear pipe 13 and the pan frame 12 in a compact manner.

Since the duct D is arranged between the pan frame 12 and the cushion side frame 11, even if a foot of an occupant seated on a seat behind the car seat S hits the pan frame 12, there will be no impact on the duct D; therefore, damage of the duct D caused by the occupant kicking the duct D by his/her foot can be restrained.

Since the duct D is in contact with the rear pipe 13, the duct D can be located in place relative to the rear pipe 13.

Since the harnesses HN extend through between one cushion side frame 11 and the pan frame 12, and the duct D extends through between the other cushion side frame 11 and the pan frame 12, it is possible to keep the duct D from getting in the way when arranging the harness HN.

Although the second embodiment has been described above, specific configurations may be modified where appropriate, as will be described below.

Figure 22:
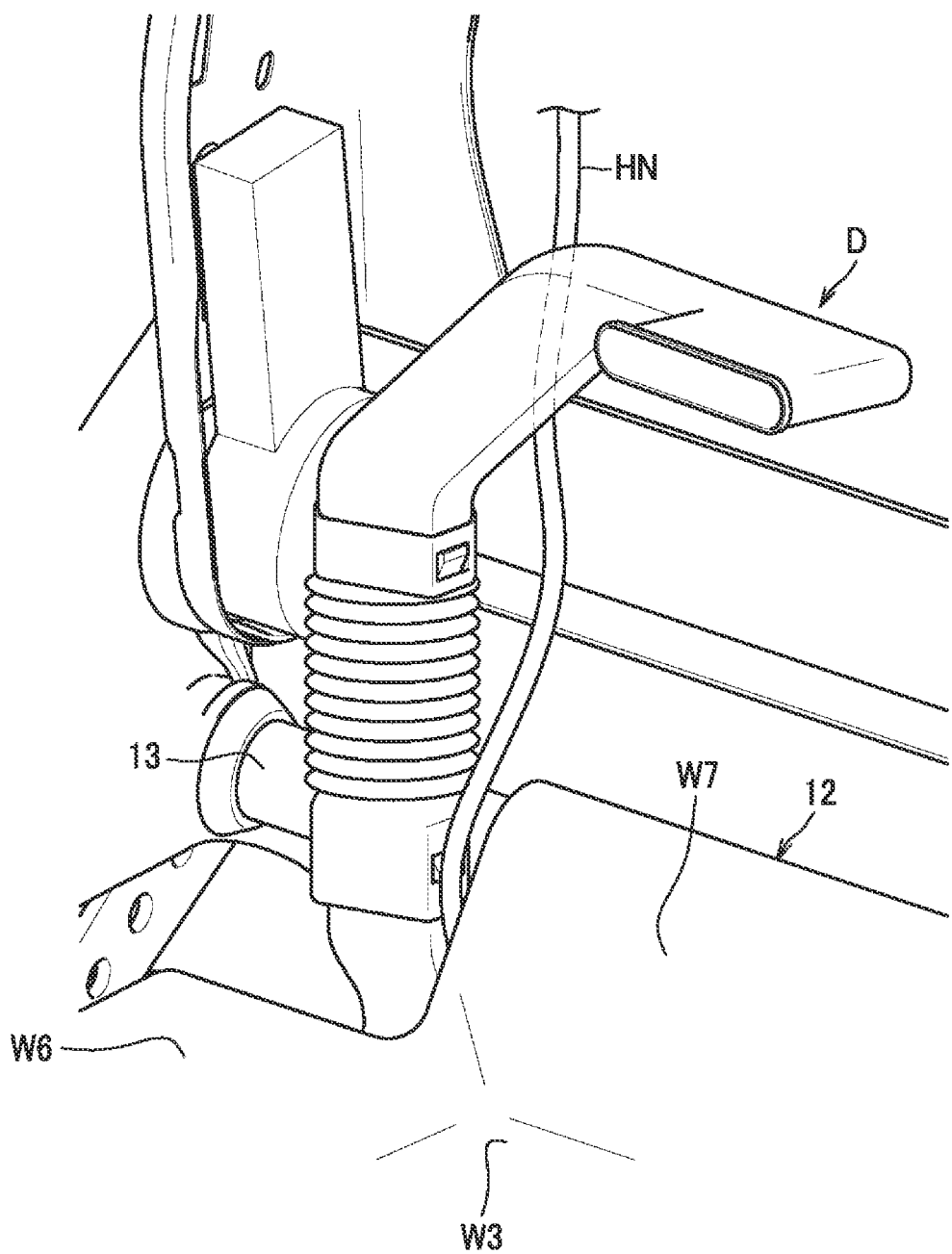
FIG. 22 is a perspective view of a configuration in which the location of the harness has been changed.

Although the duct D and the harnesses HN are located respectively on the right side and on the left side of the rear wall W7 of the pan frame 12 in the above embodiment, the duct D and the harness HN may be located on the right side of the rear wall W7 of the pan frame 12, that is on the same side in the lateral direction, for example, as shown in FIG. 22. In this case, the harness HN may be in contact with the duct D. The harness HN can thereby be supported by the duct D.

Further, in this case, as shown in FIGS. 23(a) and 23(b), the harness HN may be fixed to the duct D. The harness HN can thereby be supported more securely by the duct D.

Specifically, in the configuration shown in FIG. 23(a), the duct D has a recess D1 in which a part of an outer periphery of the harness HN is positioned. The depth of the recess D1 is smaller than a diameter of the harness HN. The harness HN is fixed to the duct D by a cable tie BD with part of the outer periphery of the harness HN positioned in the recess D1.

In the configuration shown in FIG. 23(b), the duct D has a protrusion D3 protruding outward from a given wall D2 forming the duct D. The height of the protrusion D3 from the wall D2 is smaller than the diameter of the harness HN. The harness HN is fixed to the duct D by a cable tie BD with the harness HN contacting the wall D2 and the protrusion D3.

Figure 24:
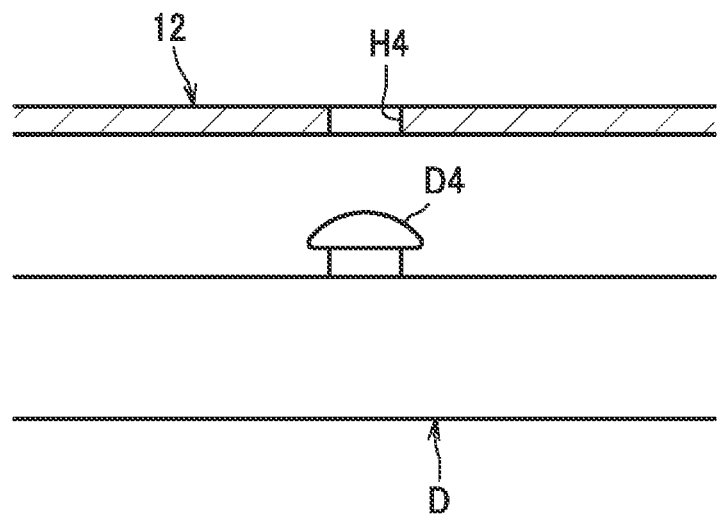
FIG. 24 is a view showing a configuration for fixing the duct on a pan frame.

Although the duct D is not fixed to the pan frame 12 in the above-described embodiment, the duct D may be fixed to the pan frame 12. To be more specific, as shown in FIG. 24, a part of the duct D located below the pan frame 12 may be provided with an upward protruding hook D4, and the pan frame 12 may be provided with a hole H4 to be engaged with the hook D4. According to this configuration, the duct D may be favorably supported by the pan frame.

Figure 25:
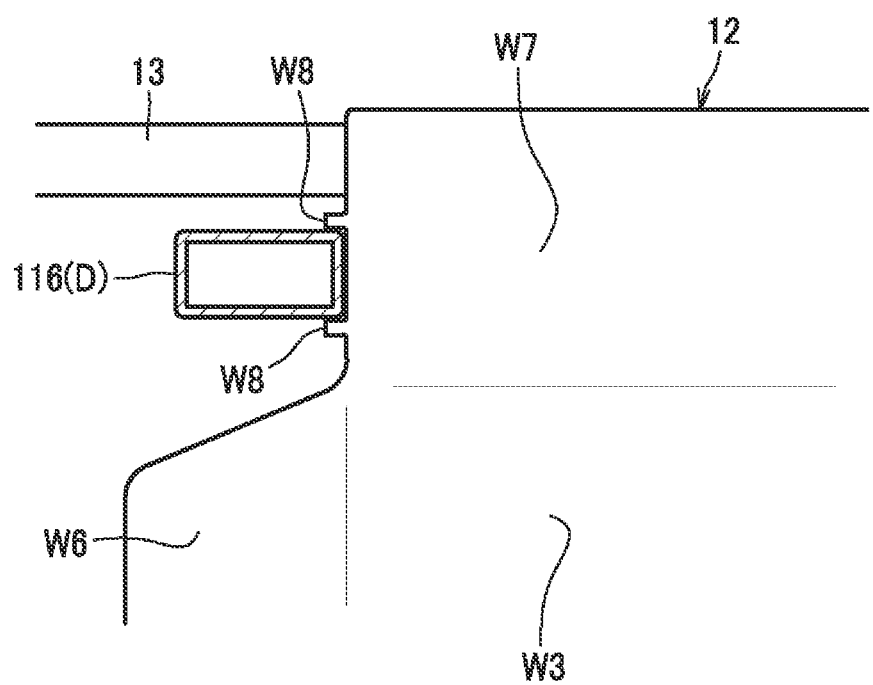
FIG. 25 is a view showing a configuration for engaging the duct with the pan frame.

Although a part of the duct D (the part extending from the seat cushion S1 toward the seat back S2, specifically, the curved tubular portion 116) is configured such that it is not in contact with the pan frame 12 in the above-described embodiment, the part of the duct D may be in contact with the pan frame 12, for example, as shown in FIG. 25. To be more specific, according to this configuration, the rear wall W7 of the pan frame 12 includes two protrusions W8 protruding outward in the lateral direction. The two protrusions W8 are aligned and located apart from each other in the front-rear direction. The part of the duct D is positioned between the two protrusions W8, and are held by the two protrusions W8. According to this configuration, since the part of the duct D is in contact with the pan frame 12, the part of the duct D can be located in place relative to the pan frame 12.

Figure 26:
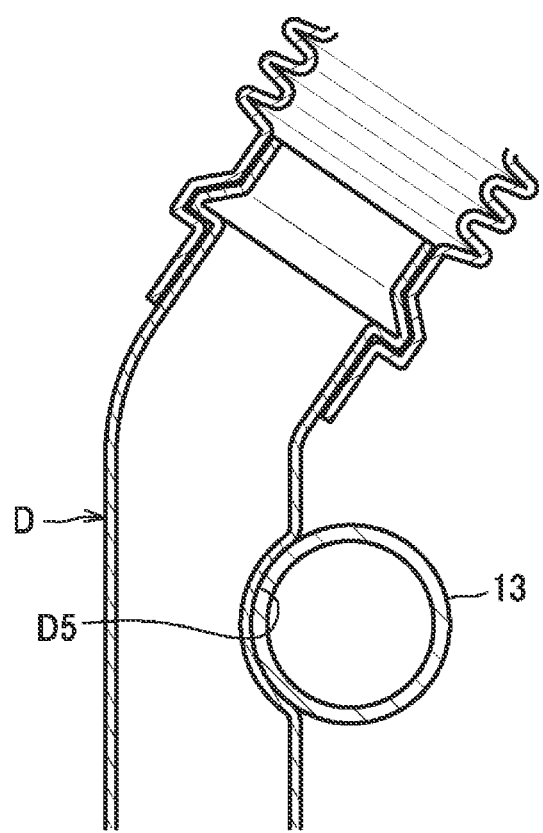
FIG. 26 is a sectional view showing a modified example of a contacting portion of the duct with a rear pipe.

Although the part of the duct D merely is in contact with the rear pipe 13 in the above-described embodiment, the part of the duct D may be provided with a recess D5, and a part of an outer periphery of the rear pipe 13 may be positioned in contact with the recess D5, as shown in FIG. 26. The depth of the recess D5, for example, may be smaller than the radius of the rear pipe 13. In this way, resistance of airflow inside the duct D which may be caused by the recess D5 can be reduced.

As shown in FIG. 27(a), the car seat S may have an inner cover CV covering a rear portion of the cushion side frame 11. In this case, the part of the duct D may be in contact with the inner cover CV. Further, as shown in FIG. 27(b), the part of the duct D may be fixed to the inner cover CV. Specifically, the part of the duct D may be provided with a hook D6, and the inner cover CV may be provided with a hole H5 to be engaged with the hook D6.

Figure 28:
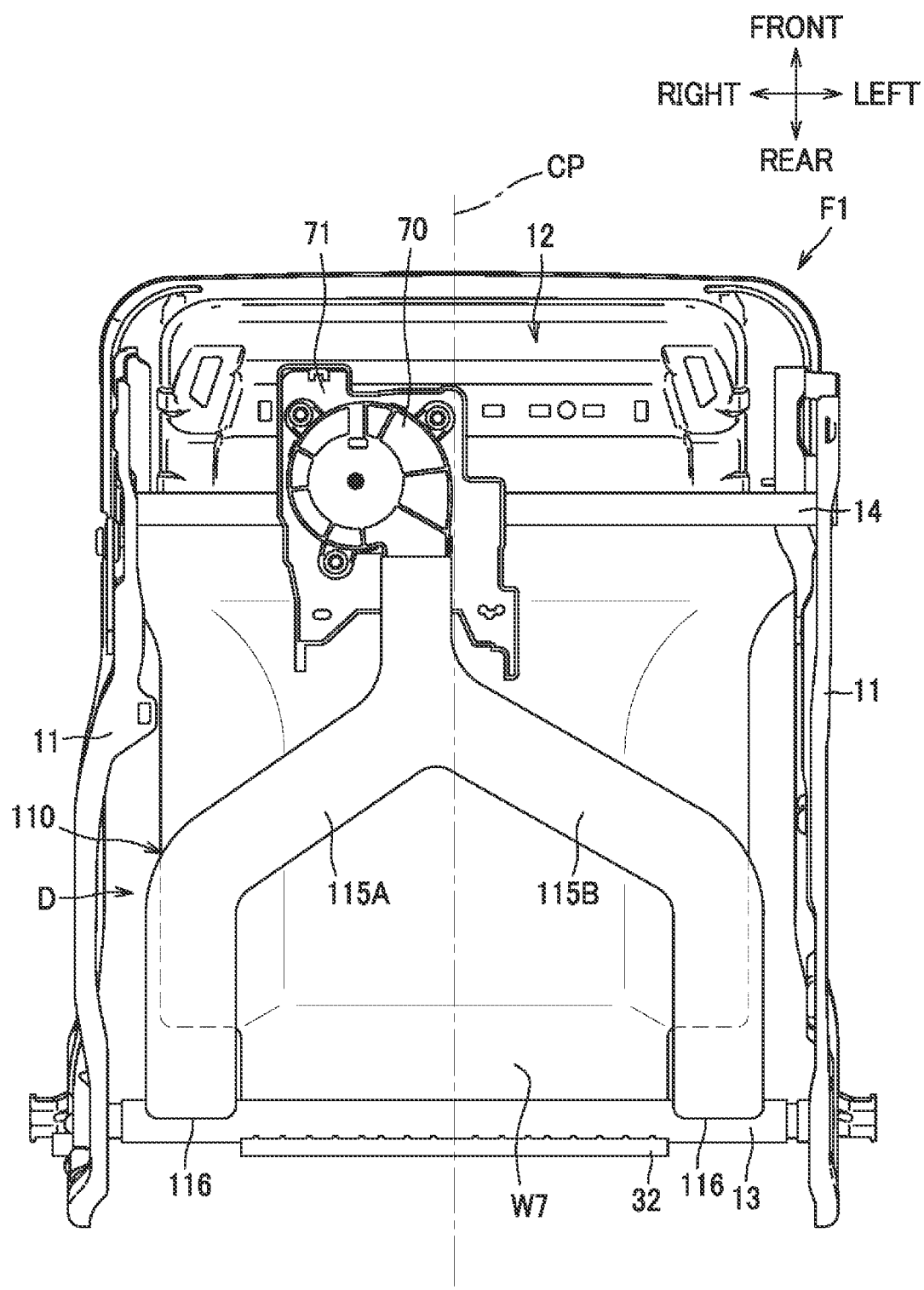
FIG. 28 is a view showing a configuration of the duct with a lower portion divided into two branches.

As shown in FIG. 28, the duct D may be divided into two branches under the pan frame 12. Specifically, according to this configuration, the first duct 110 includes a first lower tubular portion 115A with a shape substantially the same as the lower tubular portion 115 of the above-described embodiment, and a second lower tubular portion 115B extending from the first lower tubular portion 115A toward the left side of the rear wall W7 of the pan frame 12.

The rear ends of each of the lower tubular portions 115A, 115B are respectively connected to curved tubular portions 116 similar to the above-described embodiment. A right side curved tubular portion 116 extends upward through between the right side cushion side frame 11 and the rear wall W7 of the pan frame 12, and a left side curved tubular portion 116 extends upward through between the left side cushion side frame 11 and the rear wall W7 of the pan frame 12.

Each curved tubular portion 16 is connected to an air passage formed in the seat back pad P2 via a first connecting portion 117 and a third duct 130 similar to the above-described embodiment. According to this configuration, it is possible to increase the amount of air supplied to the air passage of the seat back pad P2. The second lower tubular portion 115B may be connected to the air passage of the seat cushion pad P1 via a fourth duct 140 similar to the above-described embodiment.

Figure 29:
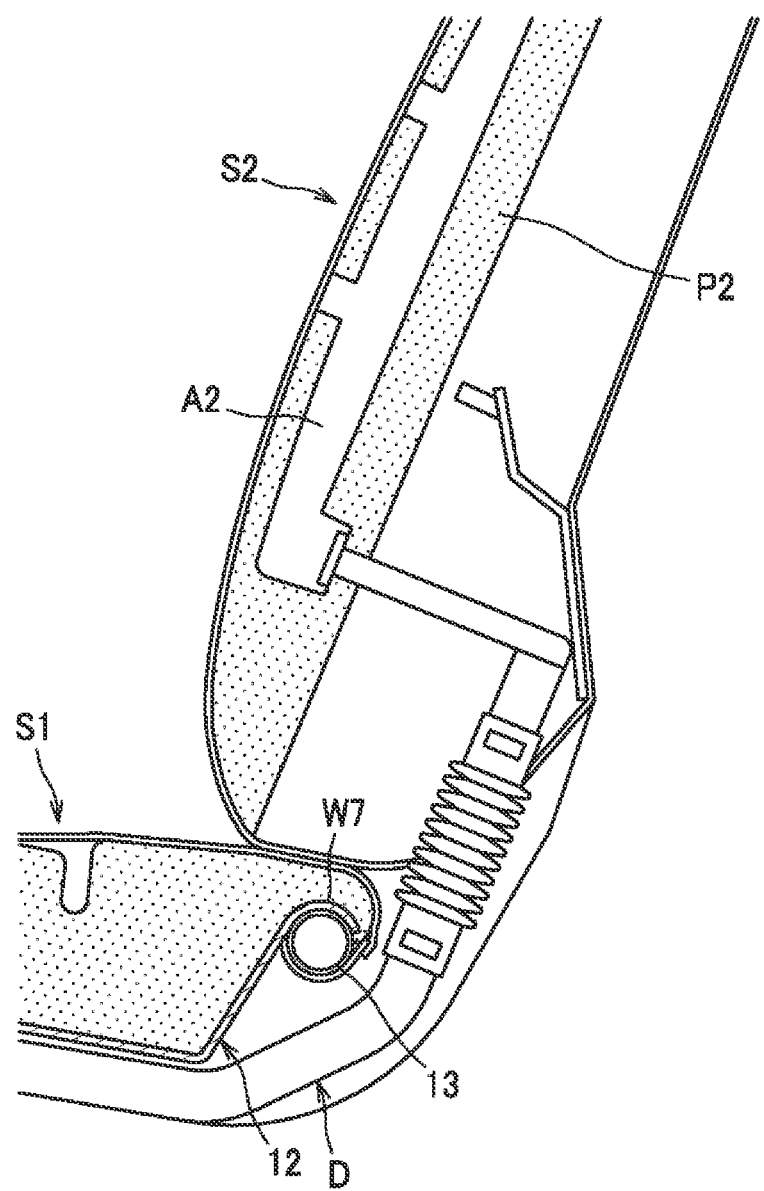
FIG. 29 is a view showing a configuration of a duct arranged to extend on the rear side of the rear pipe.

Although the duct D is configured to extend on the front side of the rear pipe 13 in the above-described embodiment, the duct D may be configured to extend on the rear side of the rear pipe 13, as shown in FIG. 29. Interference of the duct D with the motor bracket MB (see FIG. 19) can thereby be restrained.

Figure 30:
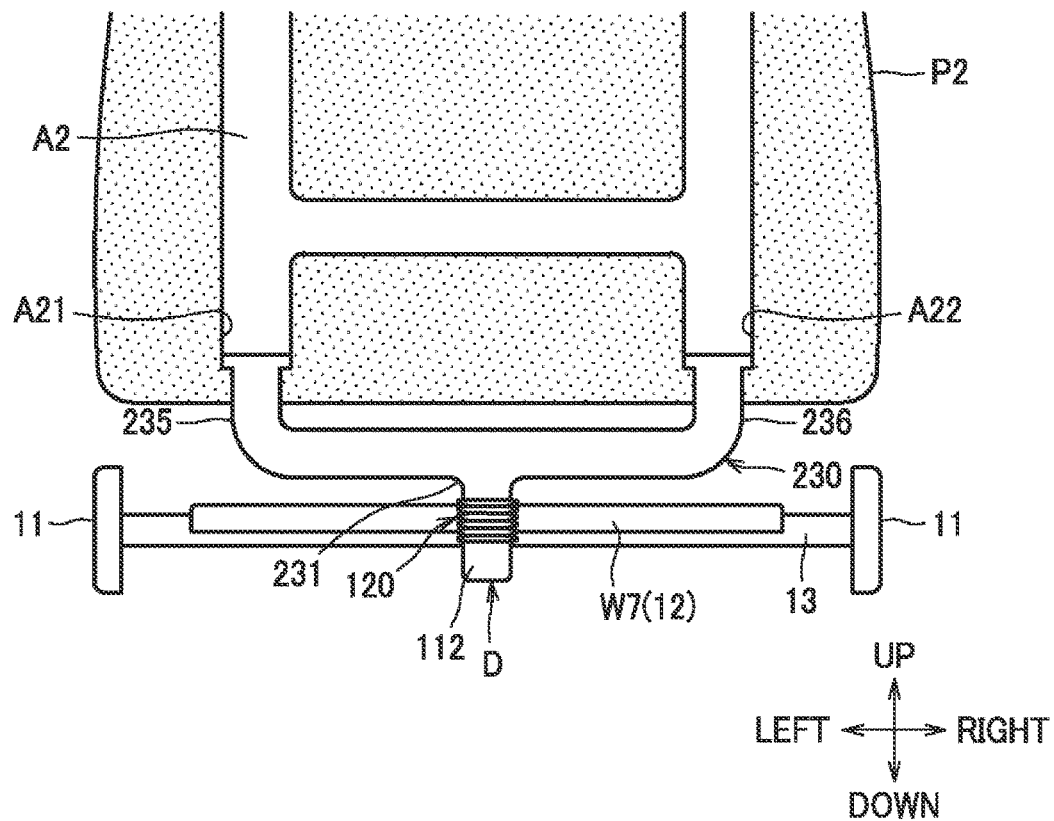
FIG. 30 is a view showing a configuration of a duct divided into two branches on the rear side of the rear pipe.

Further, in a structure in which the duct D extends on the rear side of the rear pipe 13, a part of the duct (curved tubular portion 116) may be located at the center of the rear pipe 13 in the lateral direction, as shown in FIG. 30. That is, the part of the duct D may be configured to extend on the rear side of the rear wall W7 of the pan frame 12.

In this case, the duct D may be divided into two branches on the rear side of the rear pipe 13. To be more specific, according to this configuration, a third duct 235 includes a fourth connecting tubular portion 231 connected to the second duct 120, a first extension tubular portion 236 extending leftward from the fourth connecting tubular portion 231, and a second extension tubular portion 237 extending rightward from the fourth connecting tubular portion 231.

The air passage A2 of the seat back pad P2 includes a first opening A21 that opens downward at the left side of the seat back pad P2, and a second opening A22 that opens downward at the right side of the seat back pad P2. An end portion of the first extension tubular portion 236 extends upward and is connected to the first opening A21 from below. An end portion of the second extension tubular portion 237 extends upward and is connected to the second opening A22 from below.

According to this configuration, it is also possible to increase the amount of air that flows through the air passage A2 of the seat back pad P2. In a structure in which the extension tubular portions 236, 237 are respectively connected to the openings A21, A22 from below, it is not necessary to largely bend the upper portion of the duct D in the front-rear direction as in the above-described embodiment; therefore, the outer appearance of the car seat S can be improved and pressure loss in the duct D can be reduced.

Figure 31:
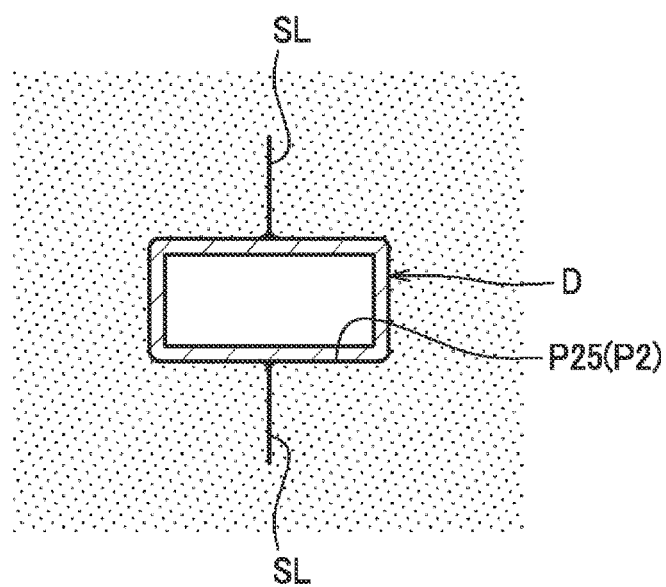
FIG. 31 is a view showing a configuration with slits formed in a connecting port of the seat back pad to be connected with the duct.

As shown in FIG. 31, slits SL may be formed in a connecting port P25 of the seat back pad P2 to which the duct D is connected. As shown in the figure, for example, one slit SL may be formed on each side of the duct D. As a result, the connecting port P25 can be easily deformed when the seat back pad P2 moves relative to the duct D as the seat back S2 moves; therefore, load that may be imposed on the duct D can be reduced. The slit may be provided on a connecting port of the seat cushion pad to which the duct is connected.

Figure 32:
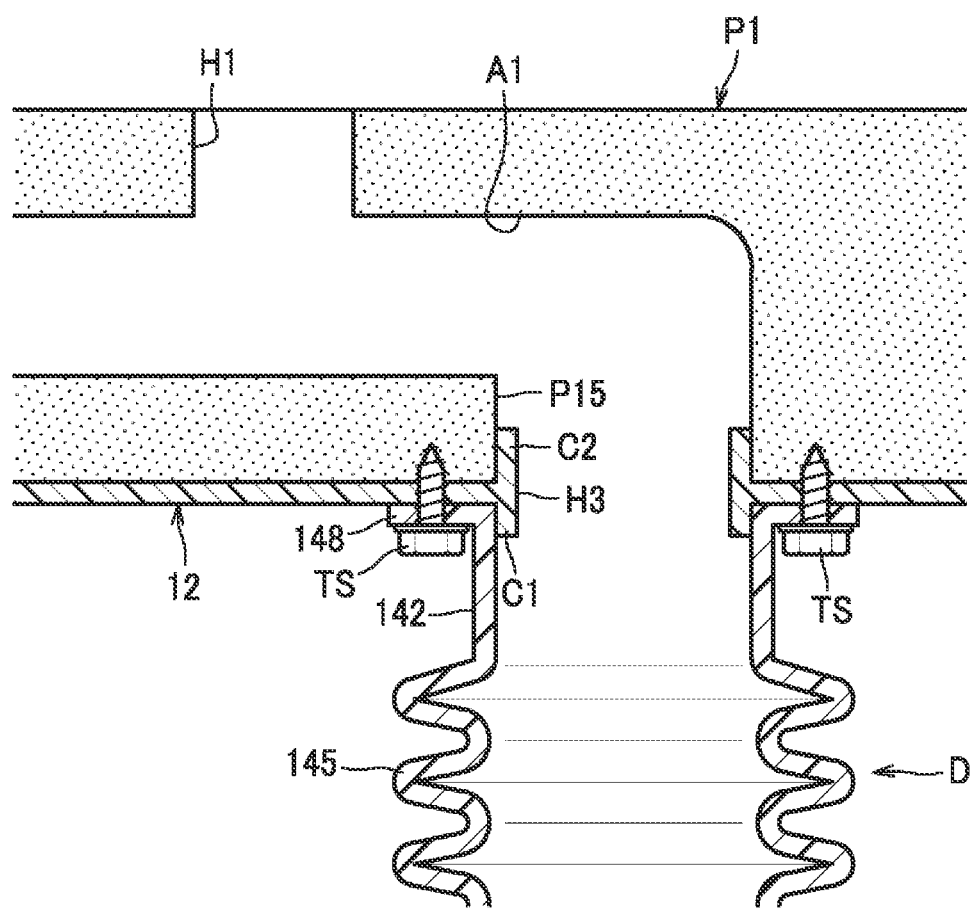
FIG. 32 is a sectional view showing a configuration in which a duct and a connecting port of a seat cushion pad is connected to a connector formed on a pan frame.

As shown in FIG. 32, the pan frame 12 may integrally include a first connecter C1 connected to the duct D, and a second connector C2 connected to the connecting port P15 of the seat cushion pad P1 to which the duct D is connected. In this configuration, the pan frame 12 is made of plastic, for example. Specifically, each connector C1, C2 is formed in a tubular shape that surrounds a hole H3 for delivering air supplied from the duct D.

The first connector C1 protrudes downward from a bottom surface of the pan frame 12. The second connector C2 protrudes upward from a top surface of the pan frame 12. An extreme end of a cushion connecting tubular portion 146 which is a portion of the duct D connected to the first connector C1 is provided with a flange portion 148 extending outwardly. The flange portion 148 is fixed to the pan frame 12 by tapping screws TS.

According to this configuration, since a part of the pan frame 12 is configured as a connector for connecting the seat cushion pad P1 and the duct D, the structure can be simplified compared to, for example, a structure in which the connector is formed as a member separate from the pan frame 12.

The first connector and the second connector may be a member separate from the pan frame. In other words, a first connector connecting the hole of the pan frame and the duct and, a second connector connecting the first connector and the air passage of the seat cushion pad P1 may be formed as members separate from the pan frame.

Although a part of the duct D (a part extending from the seat cushion S1 toward the seat back S2) is arranged around the pan frame 12 by arranging the part of the duct D outward of an outer edge of the pan frame 12 in the above-described embodiment, the part of the duct D may be arranged around the pan frame 12 by arranging the part of the duct to extend through a hole formed in the pan frame 12.

Although the pan frame 12 is given as an example of a pressure-receiving member in the above-described embodiment, the pressure-receiving member may be, for example, a member separate from the pan frame. Specifically, for example, the car seat may include a pan frame supporting a front portion of the seat cushion pad, and a pressure-receiving member supporting a rear portion of the seat cushion pad. In this case, the pressure-receiving member may be made of plastic. The pressure-receiving member may be engaged with the pan frame and the rear pipe.

The duct D may have a symmetric shape in contrast to the structure described in the above-described embodiment. The duct D, for example, may be configured without a curved portion (curved tubular portion 116). Although the duct in the above-described embodiment includes the first bellows 126 as the flexible portion, this is not a prerequisite; the flexible portion may be any structure as long as it is flexible. Although the duct D in the above-described embodiment is comprised of a plurality of connected parts, this is not a prerequisite; the duct D can be comprised of a single part.

Although a rear pipe 13 made of piping material is given as an example of a rear frame in the above-described embodiment, this is not a prerequisite; the rear frame may be a plate-like frame made of sheet metal, for example.

Although the lower end of the first bellows 126 (a part of the flexible portion) is located between the seat cushion pad P1 and the seat back pad P2 in the above-described embodiment, this is not an essential configuration; for example, the whole flexible portion may be located between the seat cushion pad and the seat back pad. Further, if the seat back has a structure that does not recline relative to the seat cushion, parts other than the flexible portion can be located between the seat cushion pad and the seat back pad. The duct may be configured without the flexible portion.

In the second embodiment, the third duct 130 and the fourth duct 140 may also be connected to a hole communicating with the air passage using a holding member 150 similar to the first embodiment. Further, the fitted connection between the first connecting tubular portion 117 of the first duct 110 and the second connecting tubular portion 125 of the second duct 120, and the fitted connection between the third connecting tubular portion 127 of the second duct 120 and the fourth connecting tubular portion 135 of the third duct 130 may be configured similar to the fitted connection between the first connecting portion 112 of the first duct 110 and the second connecting portion 121 of the second duct 120, and the fitted connection between the third connecting portion 123 of the second duct 120 and the fourth connecting portion of the third duct 130, in the first embodiment.

Although the blower 70 in the above-described embodiment is illustrated as a sirocco fan by way of example, this is not a prerequisite; for example, the blower may be a propeller fan or a turbofan. Although the car seat S in the above-described embodiment is configured such that air blows out through the ventilation holes H1, H2, this is not a prerequisite; for example, it may be configured such that air is drawn in through the ventilation holes.

The blower may be configured to be switchable between blow-out and draw-in modes, for example, by changing the direction of rotation of an impeller. Although the above-described embodiment is configured such that the car seat S includes the blower 70, the car seat itself may not include any blower. In other words, the blower may be provided in a car body of an automobile in which the car seat is installed. In this case, the car seat may be configured such that the duct is connected, for example, to an outlet or inlet for air provided in the car body.

Although the above-described embodiments are configured such that air passages to be connected to the blower via the duct are formed in both of the seat cushion and the seat back, this is not an essential configuration; and the air passages may be formed in only one of the seat cushion or the seat back.

In the above-described embodiment, the car seat S installed in an automobile is illustrated as a vehicle seat, but this is not a prerequisite; the vehicle seat may be a seat installed in a vehicle other than an automobile, for example, in a railcar, ship, aircraft, etc.

Any of the elements explained in relation to the above-described embodiments and modified examples may be implemented in combination as desired.

The invention claimed is:

1. A vehicle seat comprising:
    a blower;
    a pad including an air passage formed therein, and a hole communicating with the air passage;
    a duct connected to the hole and configured to connect the blower and the air passage, the duct comprising a first tubular portion positioned in the hole, and a first flange extending outward from the first tubular portion; and
    a holding member connected to the duct, the holding member comprising a second tubular portion connected to the first tubular portion, and a second flange extending outward from the second tubular portion,
    wherein the second tubular portion is located inside the first tubular portion, and the first flange and the second flange hold the pad therebetween.

2. The vehicle seat according to claim 1, wherein a clearance is provided between the first tubular portion and the second flange, a dimension of the clearance in a direction of thickness of the pad being smaller than a dimension of the first tubular portion in the direction of thickness.

3. The vehicle seat according to claim 1, wherein the holding member further comprises a third flange extending outward from the second tubular portion at a position different from a position of the second flange, the third flange being located inside a hollow space of the first flange.

4. The vehicle seat according to claim 1, wherein the holding member further comprises a third flange located at a position different from a position of the second flange, the third flange extending obliquely outward from the second tubular portion such that the third flange gradually extends radially outward as a distance of the third flange from the second flange increases.

5. The vehicle seat according to claim 1, further comprising:
    a seat frame on which the pad is assembled; and
    a headrest configured to support a head of an occupant seated on the vehicle seat.

6. A method of manufacturing a vehicle seat, the method comprising:
    providing a pad including an air passage formed therein, and a hole communicating with the air passage;
    providing a duct comprising a first tubular portion, and a first flange extending outward from the first tubular portion;
    inserting the first tubular portion into the hole to connect a blower and the air passage;
    providing a holding member comprising a second tubular portion, and a second flange extending outward from the second tubular portion; and
    attaching the holding member to the duct such that the second tubular portion is located inside the first tubular portion and the pad is held between the first flange and the second flange.

* * * * *